United States Patent
Zhang et al.

(10) Patent No.: US 12,075,299 B2
(45) Date of Patent: Aug. 27, 2024

(54) METHOD AND APPARATUS FOR COMMUNICATION TECHNOLOGY SELECTION

(71) Applicant: Telefonaktiebolaget LM Ericsson (publ), Stockholm (SE)

(72) Inventors: Zhang Zhang, Beijing (CN); Congchi Zhang, Shanghai (CN); Marco Belleschi, Solna (SE); Shehzad Ali Ashraf, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 127 days.

(21) Appl. No.: 17/414,119

(22) PCT Filed: Oct. 24, 2019

(86) PCT No.: PCT/CN2019/113090
§ 371 (c)(1),
(2) Date: Jun. 15, 2021

(87) PCT Pub. No.: WO2020/125199
PCT Pub. Date: Jun. 25, 2020

(65) Prior Publication Data
US 2022/0095186 A1    Mar. 24, 2022

(30) Foreign Application Priority Data

Dec. 21, 2018 (WO) ................ PCT/CN2018/122902

(51) Int. Cl.
*H04W 36/14* (2009.01)
*H04W 36/00* (2009.01)
*H04W 48/18* (2009.01)

(52) U.S. Cl.
CPC ....... *H04W 36/14* (2013.01); *H04W 36/0022* (2013.01); *H04W 36/0044* (2013.01); *H04W 36/03* (2018.08); *H04W 48/18* (2013.01)

(58) Field of Classification Search
CPC . H04W 36/14; H04W 36/03; H04W 36/0022; H04W 36/0044; H04W 48/18; H04W 36/36; H04W 36/38
See application file for complete search history.

(56) References Cited

U.S. PATENT DOCUMENTS

2007/0286168 A1    12/2007   Shibata
2009/0104907 A1    4/2009    Otting et al.
(Continued)

FOREIGN PATENT DOCUMENTS

CN    101076067 A    11/2007
CN    104349402 A    2/2015
(Continued)

OTHER PUBLICATIONS

International Search Report and Written Opinion issued in International Application No. PCT/CN2019/113090 dated Mar. 3, 2020 (9 pages).
(Continued)

*Primary Examiner* — Justin Y Lee
(74) *Attorney, Agent, or Firm* — Rothwell, Figg, Ernst & Manbeck, P.C.

(57) ABSTRACT

Embodiments of the present disclosure provide methods and apparatuses for communication technology selection. A method implemented at a first terminal device may comprise obtaining information about one or more candidate communication technologies for at least one service. The method may further comprise determining availability of the one or more candidate communication technologies of the first terminal device. The method may further comprise selecting
(Continued)

at least one communication technology from the one or more candidate communication technologies for communication between the first terminal device and at least one second terminal device based on the availability of the one or more candidate communication technologies.

13 Claims, 15 Drawing Sheets

(56) References Cited

U.S. PATENT DOCUMENTS

| | | | |
|---|---|---|---|
| 2016/0338121 A1* | 11/2016 | Wietfeldt | H04W 72/541 |
| 2017/0188391 A1 | 6/2017 | Rajagopal et al. | |
| 2017/0238230 A1 | 8/2017 | Chen | |
| 2018/0242234 A1 | 8/2018 | Semaan et al. | |
| 2019/0052436 A1* | 2/2019 | Desai | H04L 5/0055 |
| 2020/0367122 A1* | 11/2020 | Breuer | H04W 36/0085 |
| 2021/0007026 A1* | 1/2021 | Kho | H04W 36/12 |

FOREIGN PATENT DOCUMENTS

| | | |
|---|---|---|
| CN | 104969613 A | 10/2015 |
| CN | 106465369 A | 2/2017 |
| CN | 106604339 A | 4/2017 |
| CN | 107431914 A | 12/2017 |
| CN | 108541384 A | 9/2018 |
| WO | 2016/186767 A1 | 11/2016 |
| WO | 2017/189035 A1 | 11/2017 |

OTHER PUBLICATIONS

IPRP issued in International Application No. PCT/CN2019/113090 dated Mar. 16, 2021 (5 pages).
3GPP TS 23.303 V15.1.0 (Jun. 2018), 3rd Generation Partnership Project; Technical Specification Group Services and System Aspects; Proximity-based services (ProSe); Stage 2 (Release 15), Jun. 2018 (130 pages).
3GPP TR 23.785 V14.0.0 (Sep. 2016), 3rd Generation Partnership Project; Technical Specification Group Services and System Aspects; Study on architecture enhancements for LTE support of V2X services (Release 14), Sep. 2016 (52 pages).
3GPP TR 22.886 V16.0.0 (Jun. 2018), 3rd Generation Partnership Project; Technical Specification Group Services and System Aspects; Study on enhancement of 3GPP Support for 5G V2X Services (Release 16), Jun. 2018 (67 pages).
3GPP TS 22.185 V14.2.1 (Nov. 2016), 3rd Generation Partnership Project; Technical Specification Group Services and System Aspects; Service requirements for V2X services; Stage 1 (Release 14), Nov. 2016 (14 pages).
Samsung, "Solution for KI#2: PC5 Rat selection for a V2X application", SA WG2 Meeting #127bis, S2-185851, Newport Beach, USA, May 28-Jun. 2018 (2 pages).
Intel, "PC5 RAT selection considering peer's PC5 RAT capability", 3GPP TSG SA WG2 Meeting #129, S2-1810543, Dongguan, China, Oct. 15-19, 2018 (2 pages).
Intel Corporation, "On RAT selection for Nr V2X", 3GPP TSG-RAN WG2 Meeting 104, R2-1816702, Spokane, Washington, USA, Nov. 12-16, 2018 (4 pages).
Huawei et al., "Path switch procedure between Uu and PC5", 3GPP TSG-RAN WG2 Meeting #98, R2-1704715, Hangzhou, China, May 15-19, 2017 (5 pages).
Huawei et al., "Summary of [93bis#24][LTEV2V] Tx PC5 and Uu path switch for V2V", 3GPP TSG-RAN WG2 Meeting #94, R2-163815, Nanjing, China, May 23-27, 2016 (23 pages).
Samsung, "Mode 3 behaviour in shared resource pools for V2X phase 2", 3GPP TSG RAN WG2 Meeting #100, R2-1713749, Reno, Nevada, USA, Nov. 27-Dec. 1, 2017 (3 pages).

* cited by examiner

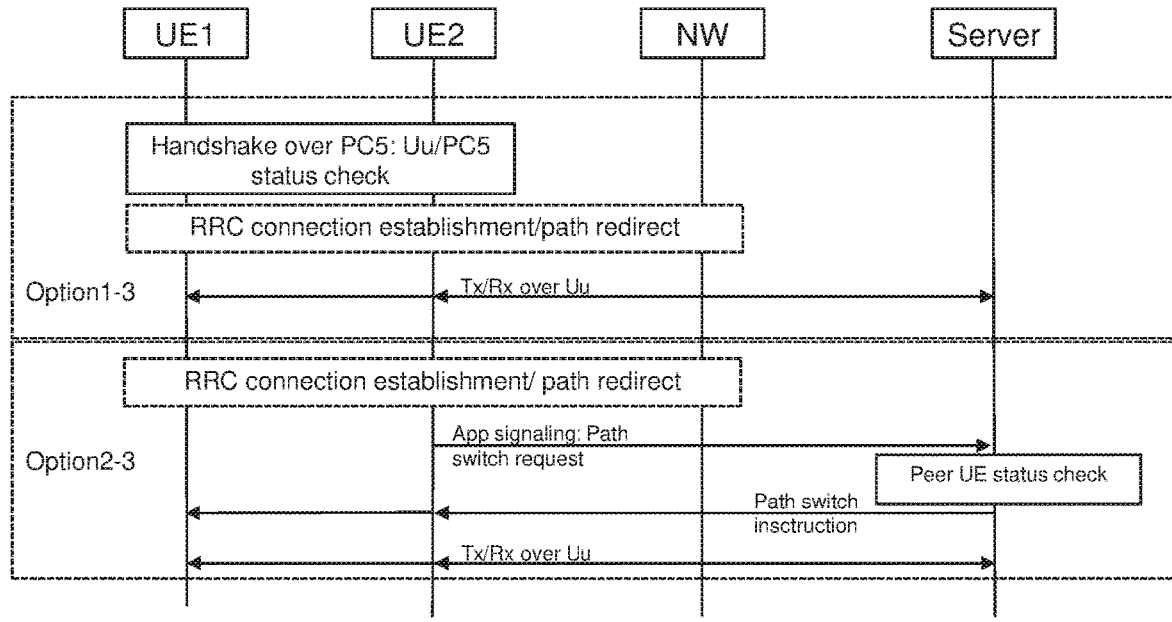

502 — Obtaining information about one or more candidate communication technologies for at least one service 504 — Determining availability of the one or more candidate communication technologies of the first terminal device 506 — Selecting at least one communication technology from the one or more candidate communication technologies for communication between the first terminal device and at least one second terminal device based on the availability of the one or more candidate communication technologies

600 ─╮

602

Determining that a first communication technology used for a communication between the first terminal device and at least one second terminal device becomes or is going to become unavailable

604

Selecting a second communication technology from the one or more candidate communication technologies based on the availability of the one or more candidate communication technologies

Obtaining information about one or more candidate communication technologies for at least one service

704

Determining availability of the one or more candidate communication technologies

706

Selecting at least one communication technology for communication between the first terminal device and at least one second terminal device based on the availability of the one or more candidate communication technologies

708

Sending a selecting result to the first terminal device

802 — Determining that a first communication technology used for a communication between the first terminal device and at least one second terminal device becomes or is going to become unavailable 804 — Selecting a second communication technology from the one or more candidate communication technologies based on the availability of the one or more candidate communication technologies 806 — Sending a selecting result about the second communication technology to the first terminal device

FIG. 8

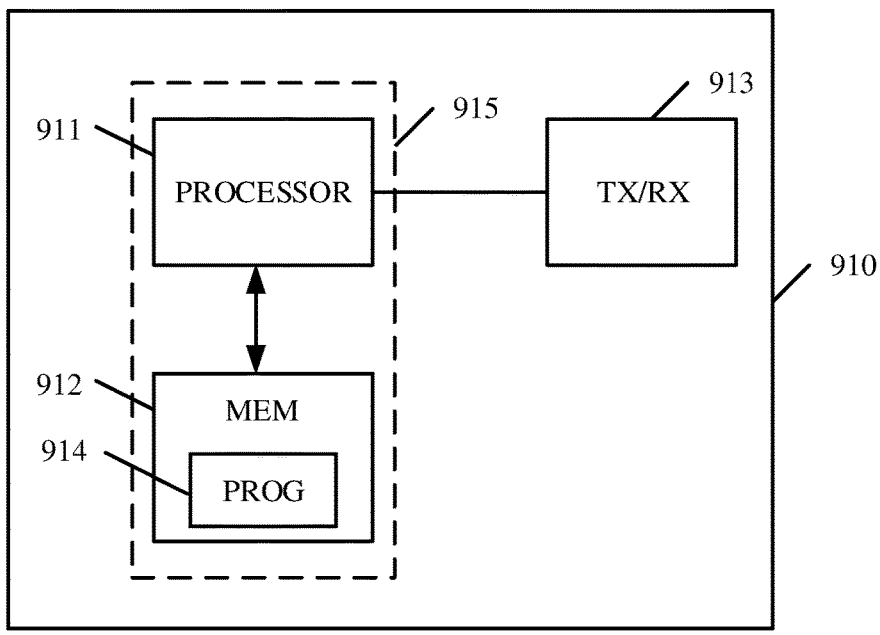

FIG. 9

METHOD AND APPARATUS FOR COMMUNICATION TECHNOLOGY SELECTION

CROSS REFERENCE TO RELATED APPLICATIONS

This application is a 35 U.S.C. § 371 National Stage of International Patent Application No. PCT/CN2019/113090, filed on Oct. 24, 2019, which claims priority to International Patent Application No. PCT/CN2018/122902, filed on Dec. 21, 2018. The above identified applications are incorporated by this reference.

TECHNICAL FIELD

The non-limiting and exemplary embodiments of the present disclosure generally relate to the technical field of communications, and specifically to methods and apparatuses for communication technology selection.

BACKGROUND

This section introduces aspects that may facilitate a better understanding of the disclosure. Accordingly, the statements of this section are to be read in this light and are not to be understood as admissions about what is in the prior art or what is not in the prior art.

Wireless communication standards are constantly evolving. The Third Generation Partnership Project (3GPP) is presently working on fifth generation (5G) wireless technology standards, which are likely to undergo numerous releases. 5G networks are expected to support multiple coexisting Radio Access Technologies (RATs), such as Long Term Evolution (LTE), the LTE PC5 sidelink interface, the New Radio (NR) Uu interface, and the NR PC5 interface. A user equipment (UE) operating in such an environment is expected to have to select a RAT from multiple available RATs in order to effectively use such networks. Not all RATs are anticipated to be equally suitable to support UEs, depending on various circumstances. Accordingly, techniques and devices that perform appropriate RAT selection are anticipated to be desirable.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In a first aspect of the disclosure, there is provided a method implemented at a first terminal device. The method may comprise obtaining information about one or more candidate communication technologies for at least one service. The method may further comprise determining availability of the one or more candidate communication technologies of the first terminal device. The method may further comprise selecting at least one communication technology from the one or more candidate communication technologies for communication between the first terminal device and at least one second terminal device based on the availability of the one or more candidate communication technologies.

In a second aspect of the disclosure, there is provided a method implemented at a network device or an application server. The method may comprise obtaining information about one or more candidate communication technologies for at least one service. The method may further comprise determining availability of the one or more candidate communication technologies of a first terminal device. The method may further comprise selecting at least one communication technology for communication between the first terminal device and at least one second terminal device based on the availability of the one or more candidate communication technologies. The method may further comprise sending a selecting result to the first terminal device.

In a third aspect of the disclosure, there is provided an apparatus implemented at a first terminal device. The apparatus may comprise a processor; and a memory coupled to the processor, said memory containing instructions executable by said processor, whereby said apparatus is operative to obtain information about one or more candidate communication technologies for at least one service; determine availability of the one or more candidate communication technologies of the first terminal device; and select at least one communication technology from the one or more candidate communication technologies for communication between the first terminal device and at least one second terminal device based on the availability of the one or more candidate communication technologies.

In a fourth aspect of the disclosure, there is provided an apparatus implemented at a network device or an application server. The apparatus may comprise a processor; and a memory coupled to the processor, said memory containing instructions executable by said processor, whereby said apparatus is operative to obtain information about one or more candidate communication technologies for at least one service; determine availability of the one or more candidate communication technologies of a first terminal device; select at least one communication technology for communication between the first terminal device and at least one second terminal device based on the availability of the one or more candidate communication technologies; and send a selecting result to the first terminal device.

In a fifth aspect of the disclosure, there is provided a computer program product, comprising instructions which, when executed on at least one processor, cause the at least one processor to carry out the method according to the first aspect of the disclosure.

In a sixth aspect of the disclosure, there is provided a computer program product, comprising instructions which, when executed on at least one processor, cause the at least one processor to carry out the method according to the second aspect of the disclosure.

In a seventh aspect of the disclosure, there is provided a computer-readable storage medium storing instructions which when executed by at least one processor, cause the at least one processor to carry out the method according to the first aspect of the disclosure.

In an eighth aspect of the disclosure, there is provided a computer-readable storage medium storing instructions which when executed by at least one processor, cause the at least one processor to carry out the method according to the second aspect of the disclosure.

In a ninth aspect of the disclosure, there is provided a communication system including a host computer comprising: processing circuitry configured to provide user data; and a communication interface configured to forward the user data to a cellular network for transmission to a user equipment comprising a radio interface and processing circuitry; wherein the cellular network comprises a base station having a radio interface and processing circuitry; wherein the base station is configured to perform any of the steps of the method according to the second aspect of the disclosure and the UE is configured to perform any of the steps of the method according to the first aspect of the disclosure.

In a tenth aspect of the disclosure, there is provided a method implemented in a communication system including a host computer, a base station and a user equipment (UE). The method may comprising at the host computer, providing user data; and at the host computer, initiating a transmission carrying the user data to the UE via a cellular network comprising the base station, wherein the base station is configured to perform any of the steps of the method according to the second aspect of the disclosure and the UE is configured to perform any of the steps of the method according to the first aspect of the disclosure.

In an eleventh aspect of the disclosure, there is provided a method implemented in a communication system including a host computer, a base station and a user equipment (UE). The method may comprise at the host computer, receiving user data transmitted to the base station from the UE, wherein the base station is configured to perform any of the steps of the method according to the second aspect of the disclosure and the UE is configured to perform any of the steps of the method according to the first aspect of the disclosure.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 4C shows a procedure for path switch from PC5 to Uu according to an embodiment of the present disclosure.

FIG. 5 shows a flowchart of a method according to an embodiment of the present disclosure.

FIG. 6 shows a flowchart of a method according to another embodiment of the present disclosure.

FIG. 7 shows a flowchart of a method according to another embodiment of the present disclosure.

FIG. 8 shows a flowchart of a method according to another embodiment of the present disclosure.

FIG. 9 illustrates a simplified block diagram of an apparatus according to an embodiment of the present disclosure.

DETAILED DESCRIPTION

Figure 1:
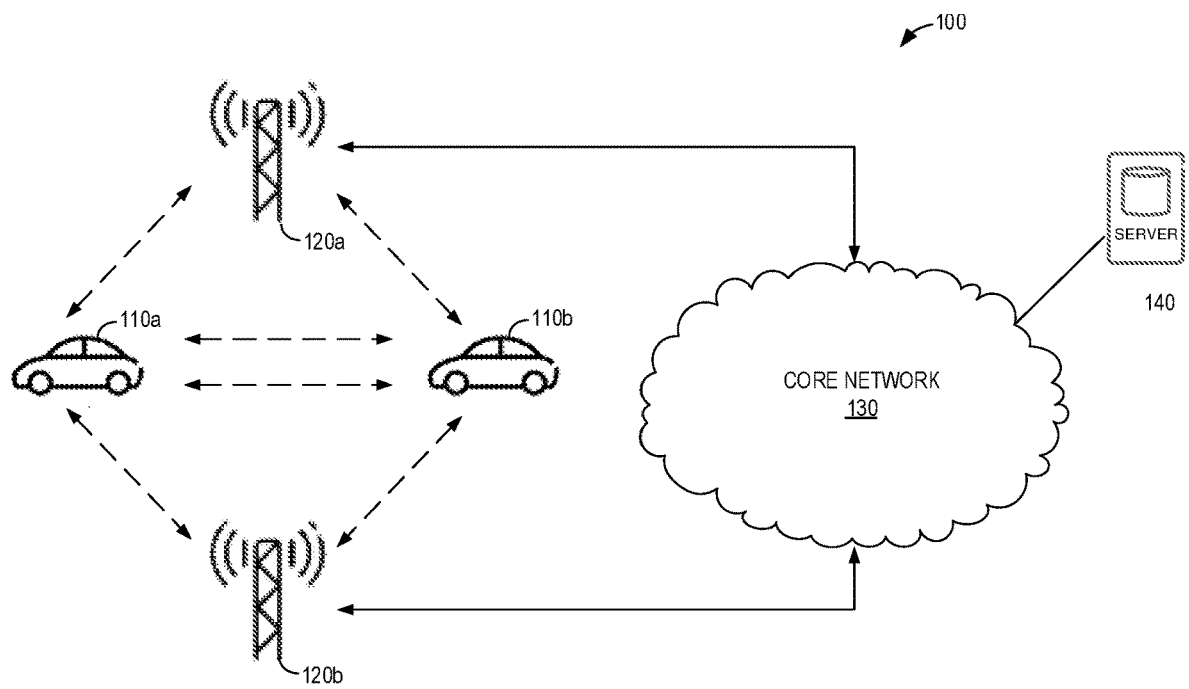
FIG. 1 illustrates an example network environment comprising a plurality of devices.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced (LTE-A), wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), an integrated access backhaul (IAB) node, a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another specific example, in an IoT scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3GPP context be referred to as a machine-type communication (MTC) device.

As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, a downlink, DL, transmission refers to a transmission from a network device to a terminal device, and an uplink, UL, transmission refers to a transmission in an opposite direction.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

In 3GPP Rel-14, the extensions for the device to device work consist of support of V2X (vehicle-to-anything) communication, which includes any combination of direct communication between vehicles, pedestrians and infrastructure. V2X communication may take advantage of a network (NW) infrastructure, when available, but at least basic V2X connectivity should be possible even in case of lack of coverage. Providing an LTE-based V2X interface may be economically advantageous because of the LTE economies of scale and it may enable tighter integration between communications with the NW infrastructure (V2I), pedestrian (V2P) and other vehicles (V2V) communications, as compared to using a dedicated V2X technology.

V2X communications may carry both non-safety and safety information, where each of the applications and services may be associated with specific requirements sets, e.g., in terms of latency, reliability, capacity, etc.

There are several different use cases defined for V2X:
  V2V (vehicle-to-vehicle): covering LTE-based communication between vehicles, either via Uu or sidelink (PC5).
  V2P (vehicle-to-pedestrian): covering LTE-based communication between a (vehicle) and a device carried by an individual (e.g. handheld terminal carried by a pedestrian, cyclist, driver or passenger), either via Uu or sidelink (PC5)

V2I/N (vehicle-to-infrastructure/network): covering LTE-based communication between a (vehicle) and a roadside unit/network. A roadside unit (RSU) is a transportation infrastructure entity (e.g. an entity transmitting speed notifications) that communicates with V2x capable UEs over sidelink (PC5). For V2N the communication is performed on Uu.

3GPP has designed a cellular eco-system where both sidelink (SL) and Uu can be used to provide V2X services. More details about the design of V2X cellular system supported by 3GPP are summarized in the following for both NR and LTE.

LTE V2X

In LTE, there are two different resource allocation (RA) procedures for V2X on sidelink, i.e. centralized RA (so called "mode 3") and distributed RA (so called "mode 4"). The transmission resources are selected within a resource pool which is predefined or configured by the network (NW).

With centralized or NW-scheduled RA (i.e. mode-3), the transmitting sidelink radio resources are dynamically scheduled/allocated by the NW. Similar to Uu scheduling, the UE requests resources for transmissions to the NW using uplink signaling (Scheduling Request (SR) and Buffer Status Report (BSR)), and as a response, the NW may grant resources via Physical Downlink Control Channel (PDCCH) for sidelink transmission to the UE. Depending on network decision, the grant provided by the NW may be valid for the transmission of a single transport block (TB), including its retransmission, or for the transmission of multiple TBs over multiple periodic resources as for the semi-persistent scheduling (SPS) grant With distributed or autonomous RA (i.e. mode-4) it is intended a resource allocation scheme in which the network provides a set of resources in broadcast fashion to be used on a certain carrier. Such resources are then contended by UEs interested in sidelink operations, according to certain rules. In particular, a UE before using certain resources shall sense such resources for some time, and in case the resources are deemed to be free it can select them for sidelink transmissions. Sensing is based on decoding of SCI (Sidelink Control Information) and (Reference Signal Received Power) measurement of physical sidelink shared channel (PSSCH) from surrounding UEs. To enable such sensing-based resource allocation, no UE specific scrambling is adopted which implies on sidelink a UE cannot be recognized in L1 (layer 1).

Depending on the specific service to be transmitted, the UE may either reserve such resources for multiple transmissions according to a desired pattern (which repeats periodically in the time domain), or it can simply select such resource for a single "one-shot" transmission. In particular, both the SL and Uu SPS framework has been designed such that it is possible to match the V2X-specific traffic pattern with high probability.

NR V2X

3GPP SA1 working group has completed new service requirements for future V2X services in the study/work item FS_eV2X. SA1 has identified 25 use cases for advanced V2X services which will be used in 5G (i.e. LTE and NR). Such use cases are categorized into four use case groups: vehicles platooning, extended sensors, advanced driving and remote driving.

The consolidated requirements for each use case group are captured in TR 22.886. For these advanced applications, the expected requirements to meet the needed data rate, capacity, reliability, latency, communication range and speed are made more stringent.

While the NR resource allocation framework is expected to roughly take the LTE V2X framework as baseline, some fundamental enhancements will be needed to fulfil the NR requirements. For example, in order to meet these requirements some improvements need to be introduced in layer-1 and layer-2 access stratum (AS) protocols, to enforce link adaption and QoS handling. Such enhancements include for instance SL channel state information (CSI) feedback, SL HARQ (Hybrid automatic repeat request) feedback, ARQ (automatic repeat request) schemes, RLC AM (Radio link control Acknowledged Mode), QoS (Quality of Service) admission control, etc.

Additionally, NR V2X services are expected to be transmitted using different casting schemes. In particular for some applications, such as cooperative driving, dynamic ride sharing, video/sensor data sharing etc, unicast will be likely needed. For platooning use cases, groupcast communication would be a preferred option. For broad provisioning of alert messages, broadcast communication is instead preferred. Obviously, depending on the specific casting scheme uses, resource allocation will be different, both because of different interference/channel conditions, and different QoS requirements.

Path Selection

V2X services can be provided both over the PC5 interface over the sidelink and the Uu interface via UL/DL operations. Whether to use Uu or PC5 interface for V2X, strictly may depend on several factors. The characteristics of a specific V2X service plays a fundamental role here. For example, for those services that require a very short latency, PC5 is preferred since the delay of Uu channel access, mobility procedures and most important core network delays can be avoided. However, there are other V2X services, such as queue warnings, alerts on road conditions etc, which require a very large communication range which cannot be achieved with just SL operations.

Additionally, whether to use the PC5 interface or the Uu may also depend on the radio conditions. In general, achieving very robust communications over the SL may be challenging, due to the distributed nature of the system with no or relaxed centralized control, such as the gNB. Therefore, in case of very high channel congestion the usage of Uu may be preferred. At the same time, the PC5 may be used as means to offload Uu traffic, especially in those cases in which PC5 is low congested.

Therefore in general, there might be multiple factors influencing the decision of using PC5 or Uu. Some of such factors are more radio-related, some others instead may depend more on the characteristics of the V2X traffic itself as well as service provider or network operator configuration.

In NR V2X unicast and groupcast will also be supported over PC5, in this case path selection only at Tx (transmitter) side may not work properly, for instance:

The path configuration is inconsistent at Tx and Rx (receiver) side, e.g. both Uu and PC5 are allowed at Tx side while only Uu is allowed at Rx side for (a certain) V2X service.

Tx is in coverage while Rx is out of coverage, as a result communication over Uu is not possible.

Tx is in connected mode while Rx is in idle mode, in this case (unicast) communication over Uu is not possible for the Rx UE in idle mode.

Tx and Rx have different PC5 RAT capabilities, e.g. the Rx can only support LTE PC5 while the Tx only support NR PC5, in this case (unicast) communication over PC5 is not possible between the two UEs.

Besides, the advanced V2X use cases have (much) more stringent performance requirements. Even a path is configured for V2X transmission, the performance requirements may not be fulfilled, it makes no sense to transmit the V2X service using this path.

To overcome or mitigate at least one of the above mentioned problems or other problems or provide a useful solution, the embodiments of the present disclosure propose a new path selection and switch solution. Some embodiments of the present disclosure may provide methods for path switch between different communication technologies such as sidelink (PC5) and Uu. Some embodiments of the present disclosure provide procedures for path switch from Uu to PC5, involving UE, network (NW) and application server. Some embodiments of the present disclosure provide procedures for path switch from PC5 to Uu, involving UE, NW and application server. Some embodiments of the present disclosure provide a path selection and switch solution by considering different communication technologies (such as Uu and/or PC5 path) availability at both Tx side and Rx side. In some embodiments of the present disclosure, the path switch may be triggered either by the NW or by the UE. In some embodiments of the present disclosure, signaling for indicating, exchanging and checking path availability, over either Uu or PC5, or both. In some embodiments of the present disclosure, signaling for instructing and acknowledging path selection/switching, over either Uu or PC5, or both.

Many advantages may be provided by the path selection and switch solution proposed by the embodiments of the disclosure. For example, in some embodiments of the present disclosure, the path availability at both Tx and Rx side may be taken into account, which may mitigate unnecessary communication technologies switching, reduce the switching failure, and improve the performance.

FIG. 1 illustrates an example network environment 100 comprising a plurality of devices. As used herein, a wireless device is any device capable of exchanging wireless communication signals with another wireless device. The particular network environment 100 illustrated in FIG. 1 comprises two UEs 110a, 110b, two access nodes 120a, 120b, a core network (CN) 130, and an application server 140. Although each of the access nodes 120a, 120b in this example is configured to provide UE access to the core network 130 and the application server 140, other embodiments include access node 120a, 120b being configured to provide UE access to respective core networks (not shown). The application server 140 may provide at least one service to UEs. Moreover the application server 140 may relay traffic between the UEs.

One of the access nodes 120a is an NR access node that supports communication over the NR Uu interface. The other access node 120b is an LTE access node that supports communication over the LTE Uu interface. The two UEs 110a, 110b each support communication with either of the access nodes 120a, 120b, and each other. Thus, UE 110a and access node 120a are capable of communicating with each other via the NR Uu interface, and UE 110a and access node 120b are capable of communicating with each other via the LTE Uu interface. UE 110b and access node 120a are capable of communicating with each other via the NR Uu interface, and UE 110b and access node 120b are capable of communicating with each other via the LTE Uu interface. The UEs 110a, 110b are capable of communicating with each other directly over the NR PC5 interface and the LTE PC5 interface, as well as via the access nodes 120a, 120b over the NR Uu interface and LTE Uu interface, respectively.

In this particular example, both of the UEs 110a, 110b are vehicles (or are comprised therein). In 5G, vehicle-to-everything (V2X) services often come with stringent Quality of Service (QoS) requirements (e.g. 99.999% reliability and 10 ms latency). Such ultra-reliable and lower latency wireless connections permit vehicles, for example, to optimize their maneuvers and engage in cooperative driving, whereas a disturbance or interruption on the wireless connection may lead to hazardous situations or even a car accident. Other situations may involve less critical communication.

A UE 110 (e.g., either or both of the UEs 110a, 110b) may choose one or multiple of the interfaces over which to transmit any V2X message. In a V2X scenario, selecting a proper RAT (and corresponding interface) may be challenging due to QoS requirements, UEs 110 that are moving fast (and may have unstable network connections, for example), and/or compatibility issues. For example, since a UE 110 that is specific to LTE PC5 may not be able to decode messages sent via an NR PC5 interface. Thus, a transmitting UE 110 must select the LTE PC5 interface if a UE that only supports LTE PC5 is expected. Further, service continuity may be difficult to maintain if one UE 110 frequently switches between RATs (and their corresponding interfaces).

Figure 2:
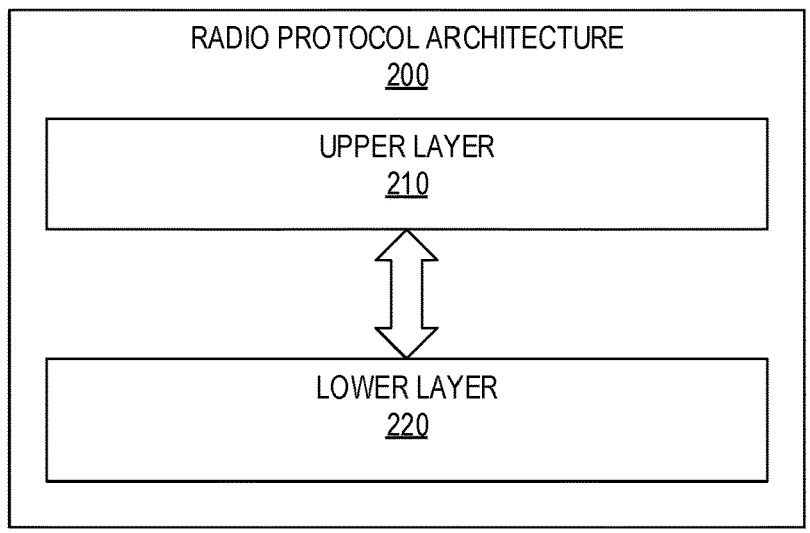
FIG. 2 is a schematic block diagram of an example radio protocol architecture, according to particular embodiments of the present disclosure.

A wireless device (e.g., UE 110, access node 120) may comprise a radio protocol architecture for communicating over an interface. An example of such a radio protocol architecture 200 is illustrated in FIG. 2. The radio protocol architecture 200 comprises an upper layer 210 and a lower layer 220. To support some interfaces (e.g., LTE), the upper layer 210 selects whether to use the Uu and/or the PC5 interface for communication, and configures the lower layer 220 accordingly. In some embodiments, RAT selection (and correspondingly, path selection via an access node 120 that supports a given RAT) may depend on the service corresponding to the communication and/or UE subscription information.

A lower layer 220, as defined in this disclosure, includes any Layer 1 (L1) and/or Layer 2 (L2) radio protocol architecture layer, individually or in combination. For example, a lower layer 220 may comprise the physical (PHY) layer, the Media Access Control (MAC) layer, the Radio Link Control (RLC) layer, the Packet Data Convergence (PDCP) layer, the Service Data Adaptation Protocol (SDAP) layer, or any combination thereof. An upper layer 210, as defined in this disclosure, includes any one or more layers, individually or in combination, that are above the lower layer 220. For example, the upper layer 210 may comprise any L2 layer (e.g., the RLC layer, the MAC layer, the PDCP layer, and/or the SDAP layer) according to embodiments in which such layers are not included in the lower layer. Additionally or alternatively, the upper layer 210 may comprise any Layer 3 (L3) or above, such as an application layer (for example).

For instance, some V2X services may only be supported over the LTE PC5 interface. Additionally or alternatively, the subscription contract and service level agreement (SLA) of a UE may limit access to certain RATs. Such information may be transparent to access stratum (AS) layers. Therefore, allowing an upper layer to select (e.g., reselect) the RAT (and corresponding path) may addresses service level issues in some embodiments.

Figure 3A:
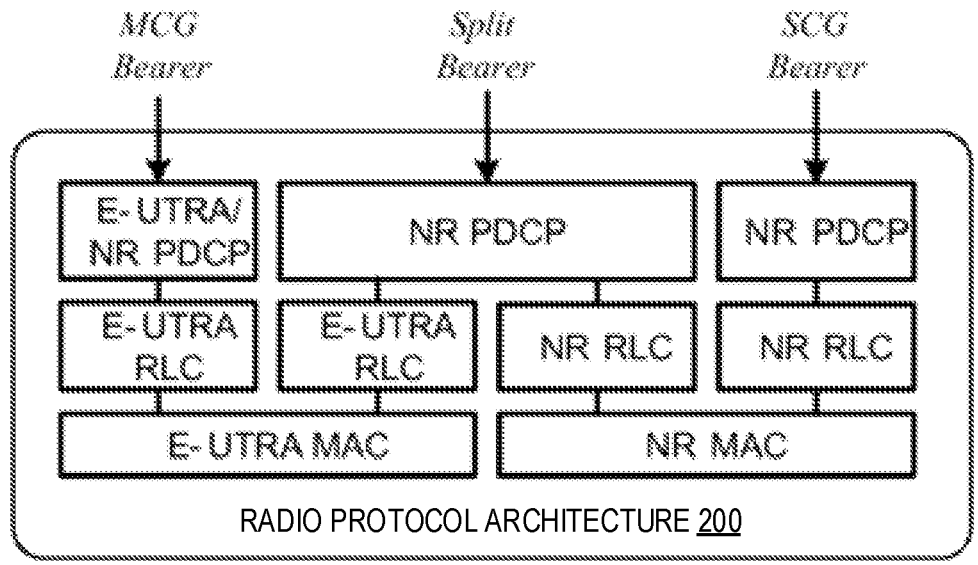
FIGS. 3A and 3B are schematic block diagrams of more detailed examples of radio protocol architectures, according to particular embodiments of the present disclosure.
Figure 3B:
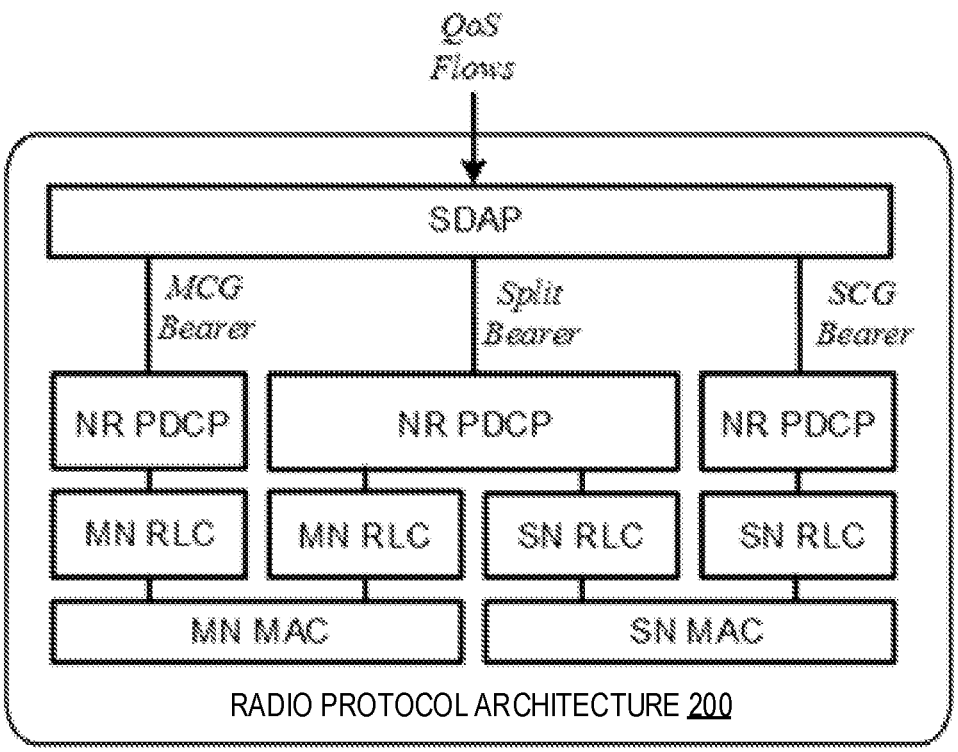

FIGS. 3A and 3B illustrate different example radio protocol architectures 200 (e.g., as implemented in a UE 110 and/or access node 120) that supports multi-RAT dual connectivity (MR-DC). The radio protocol architecture 200 illustrated in FIG. 3A, for example, may be used with an Evolved Packet Core (EPC). Additionally or alternatively, the radio protocol architecture illustrated in FIG. 3B may be used with a 5G core (5GC).

The PDCP layer in LTE and in NR is capable of Packet Data Unit (PDU) routing in the case of a split bearer. As shown in FIGS. 3A and 3B, a split bearer may carry, for example, an LTE RLC bearer and an NR RLC bearer. PDCP is responsible for splitting the RLC bearers and routing them to their corresponding RLC layer. The SDAP layer is introduced in 5G and is responsible for mapping a QoS flow to a bearer.

RAT selection may be performed in a variety of ways. For example, the UE, network device or application server may select the RAT based on the availability of the one or more candidate RATs at a transmitting UE and a receiving UE. In addition, the UE, network device or application server may select the RAT based on V2X application type and/or V2X QoS class. Additionally or alternatively, the UE, network device or application server may select the RAT may select a RAT based on the link qualities of the PC5 and/or Uu interfaces of each RAT, connection status in each RAT, load status of the access node 120 in each RAT, UE capability, the V2X application type and/or the QoS class of the initiated V2X application. Additionally or alternatively, the UE, network device or application server may select the RAT may select the RAT based on a priority list comprising a priority level for each RAT that is configured by the network and indicates the network's RAT selection preference for each V2X application type and/or each V2X QoS class. Additionally or alternatively, the UE 110 may use multiple RATs simultaneously. For example, the UE 110 may use multiple RATs to support the same V2X application in order to enhance throughput and/or reliability, among other things. Additionally or alternatively, after RAT selection, the Uu and/or PC5 interface could be further selected based on V2X application type, coverage situation, connection state, and/or network resource status. In general, such RAT selection (e.g., reselection) solutions may be implemented by an upper layer based on assisting information from a lower layer. In some embodiments, the selection could be performed on the network side, and the UE 110 may be notified via network signaling. Alternatively, the selection may be performed by the UE 110 based on a RAT list provided by the network.

Note that although embodiments discussed throughout this disclosure specifically reference RAT selection, it will be appreciated that such RAT selection also selects a path for communication between devices. For example, selecting to use a given RAT for a communication results in selecting a path for the communication that includes a segment in which the selected RAT is used. Thus, the terms RAT selection and path selection may be interchangeably used without departing from certain essential characteristics of the present disclosure.

Given the numerous factors that may be considered in RAT selection, (e.g., priority of the RAT, lower layer measurements, and other factors as discussed above), algorithms that benchmark the RATs and enable RAT selection may be quite complicated. In general, it would be advantageous for RAT selection to be performed efficiently.

Moreover, RAT reselection may introduce service continuity considerations. For example, if RAT selection performed by an upper layer triggers the UE 110 to switch RATs, the current session via the current RAT is terminated and a new session via the new RAT is established. Frequent service activation and deactivation may negatively impact performance, particularly with respect to V2X services having stringent QoS requirements. Indeed, poor service continuity may be a considerable drawback in embodiments that solely use upper layer based RAT selection.

It is noted that some embodiments of the present disclosure are mainly described in relation to LTE or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does not limit the present disclosure naturally in any way. Rather, any other system configuration or radio technologies may equally be utilized as long as exemplary embodiments described herein are applicable.

As used herein, terminology "path selection" is intended that a mobile network entity such as the UE (which can be the AS layers or the application client in the UE) or a access network device or a core network node (which can be the gNB, the eNB, the MME (Mobility Management Entity), the AMF (Access and Mobility Management function), the SMF(Session Management Function), the P-GW (Packet Data Network Gateway), the V2X control function, etc), or a server (which can be a V2X server controlling the V2X application function) select at least one of communication technologies for transmission of a certain service such as V2X service. The said mobile network entity may also select the specific communication technology, e.g. LTE Uu, NR Uu, LTE PC5, NR PC5. Also non-3GPP access technology may be selected by the said mobile network entity, such as Wifi, IEEE 802.11p, etc.

In some embodiments of the present disclosure, the one or more paths which can be selected for each service such as V2X service may take into account the following procedures.

Among the paths indicated by upper layers for a given service such as V2X service, the access stratum indicates to upper layers for each path the associated radio availability and/or unavailability to upper layers.

Among the paths indicated by upper layers for a given service such as V2X service, the access stratum indicates which path shall be selected by upper layers, i.e. only one path is indicated as available by AS (access stratum, i.e. any of PHY, MAC, RLC, PDCP, RRC, SDAP layer) and the other possible paths are implicitly or explicitly indicated as not available.

In some embodiments of the present disclosure, for those services for which only one path can be selected as indicated by upper layers, no path availability may be indicated to upper layers if the path is available. A path unavailability may be indicated if such path is not available.

In some embodiments of the present disclosure, if more than one path is indicated as available to upper layers, the upper layers do the final selection.

In some embodiments of the present disclosure, the service such as V2X which are considered may only be the services such as V2X that the application layer is requiring the UE to transmit at a certain point in time.

In some embodiments of the present disclosure, the services may be all possible services that the UE may be capable to transmit. The service may be represented in various ways. For example, the V2X service may be represented in AS by a V2X service ID, or destination L2 ID, or LCID (Logical Channel Identity), or bearer ID, or terms of LCG (Logical Channel Group) (in which case one LCG may include more than one V2X service).

In some embodiments of the present disclosure, path switch from a first communication technology such as PC5 to a second communication technology such as Uu could be triggered when the first communication technology such as PC5 becomes unavailable while the second communication technology such as Uu is available, while the path switch from the second communication technology such as Uu to the first communication technology such as PC5 could be triggered when the second communication technology such as Uu becomes unavailable while the first communication technology such as PC5 is available.

In some embodiments of the present disclosure, the proposed path selection and switch solution may apply to both unicast, groupcast, broadcast SL communications.

In some embodiments of the present disclosure, communication technology such as RAT availability may comprise at least one of
- With path availability of a given interface, it is intended that certain conditions, or a certain combination of conditions are fulfilled at AS for that interface. Such radio conditions include but are not limited to the following factors:
- The congestion (such as the CBR (Congestion Busy Ratio) level) or interference level (such as the RSRP (Reference Signal Received Power)/RSRQ (Reference Signal Received Power) for the concerned interface as measured at any of the said mobile network entity is below a certain threshold. The said threshold can be different for different QoS requirements associated to different V2X services.
- The concerned interface is not barred by the network device such as gNB for the cell selected for the transmission of a given V2X service
- Radio resources are assigned for transmission of the given service in the concerned interface by the network device such as gNB, e.g. SL resource pool for transmission is assigned by the gNB
- The QoS requirement associated to a given service is maintained over a certain time window. For example, the target packet delay budget is maintained, and/or the target BLER (Block Error Rate) (i.e. the ratio between packets successfully transmitted (HARQ ACK received) and overall packets transmitted) is above a certain value.
- The communication technology such as PC5 interface is available if discovery procedures has been successfully performed between two or more UEs, i.e. two or more UEs which are interested in the same service, and that are located in the same geographical area have discovered each other.
- The communication technology such as Uu interface for a given service is available if random access is performed successfully, and/or if the communication technology bearer such as Uu bearer for the given service has been successfully established.

In some embodiments of the present disclosure, the path availability may be indicated periodically or only when any of the above events occur.

In some embodiments of the present disclosure, similar criteria to what described above can also be used by access stratum to declare that one or more paths associated to a given service are no longer radio available.

Figure 4A:
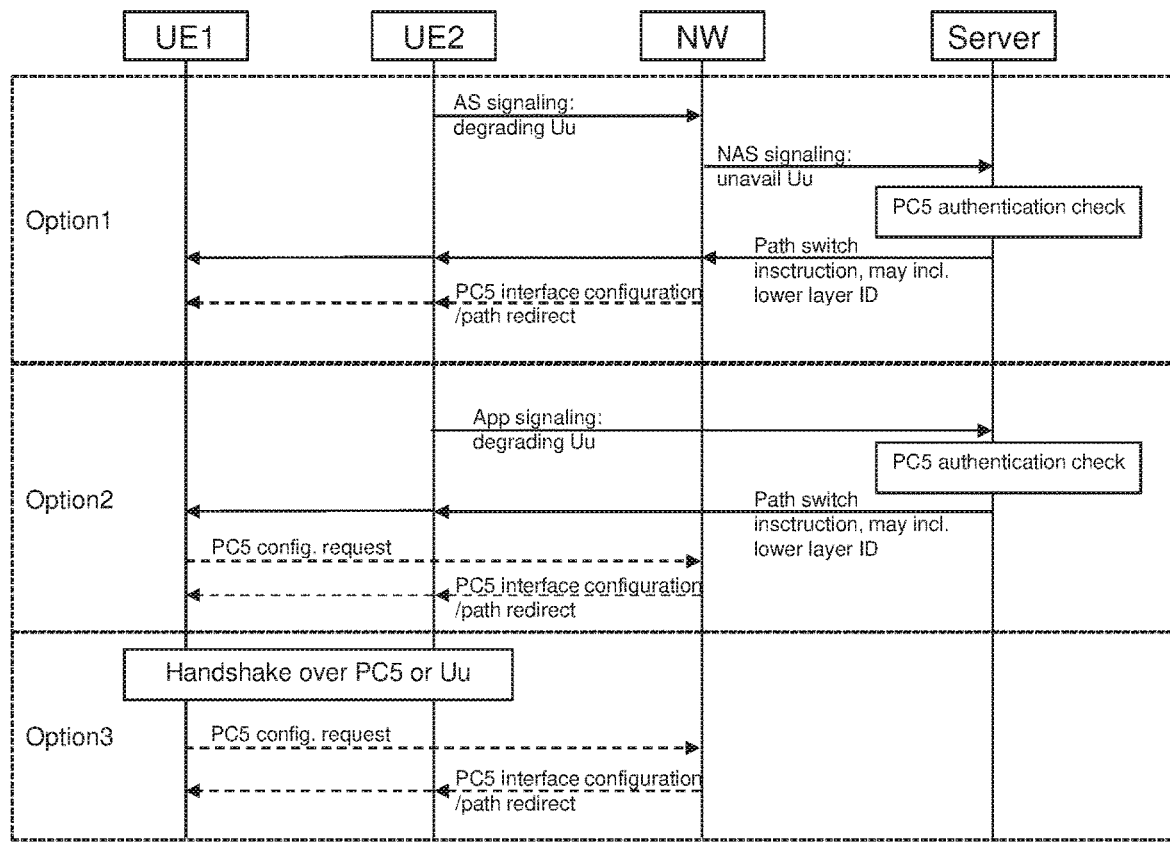
FIG. 4A shows a procedure for path switch from Uu to PC5 according to an embodiment of the present disclosure.

FIG. 4A shows a procedure for path switch from Uu to PC5 according to an embodiment of the present disclosure. In this embodiment, the path switch is initiated by UE. In this embodiment, UE1 and UE2 are communicating (certain service(s)) with each other over Uu via an application server, and the Uu path is becoming or becomes unavailable, the path switch from Uu to PC5 can be initiated by any of UE1 and UE2.

In an embodiment of the present disclosure, the procedures described below with reference to FIG. 4A are only performed if PC5 interface is available for the concerned service.

In another embodiment of the present disclosure, the procedures described below with reference to FIG. 4A are performed irrespective of whether the PC5 interface is available. If the PC5 interface is available, UE1 or UE2 may select the PC5 interface for the transmission of the given service.

In another embodiment of the present disclosure, irrespective of whether the PC5 interface is available, the following procedures may happen:
- The Uu interface is (re)selected for the given service, but another frequency is used for the transmission of the said service. For example, the gNB may trigger a handover so that the UE transmits the said service on another cell. The new frequency selected by the gNB is in the set of possible frequencies in which the said service can be transmitted as per upper layer configuration.
- The upper layers indicate for the said service a new set of possible frequencies where such service could be transmitted, where the said set of possible frequencies does not include the frequency for which the Uu path is declared not available. The gNB/eNB selects the V2X frequency for Uu communication from this newly provided set.
- Transmission of the given service is stopped by the application layer.
- The service is barred at AS, which implies that the gNB/eNB may issue a barring flag for the given service in broadcasting signal for the problematic cell.
- Service discovery is triggered between said UE1 and UE2s, i.e. the application server configures UE AS layers to initiate discovery procedures. eNB/gNB may configured the UE with SL resource pool for discovery communication.

In an embodiment of the present disclosure, the path switch is initiated by UE. UE can determine that its Uu path is going to become unavailable due to e.g. degradation in channel quality for one or more services. There are different ways to inform the Uu path unavailability to the upper layer:
- Option1: The UE informs the Uu path unavailability for one or more services and optionally the PC5 availability to the NW (e.g. gNB/eNB), and the NW further informs the Uu path unavailability for one or more services and optionally the PC5 availability to the application server and/or to a core network node.
- Option2: The UE informs the Uu path unavailability for one or more services and optionally the PC5 availability to its upper layer (e.g. the application client), and the UE's upper layer informs the Uu path unavailability for one or more services and optionally the PC5 availability to the application server. The application server in turn may signal that to any core network node and to the gNB/eNB.

Option3: The UE informs the Uu path unavailability for one or more services and optionally the PC5 availability to its upper layer (e.g. the application client), without further informing the Uu path unavailability for one or more services and optionally the PC5 availability to the application server.

For some of the above options (e.g. option 1) the network (NW) may provide the PC5 (e.g. resource pool for service communication and/or service discovery) configurations to UE1 and UE2 together with the path switching instruction.

In options 2 and 3, the UE could send a request to the NW for sending the PC5 configurations. Alternatively, the UE could obtain the PC5 configurations from relevant system information block(s) (SIB(s)) (applicable to all the options).

For options 1 and 2, the application server could inform the two UEs to switch the transmission to PC5 path if PC5 is authorized to be used for both UEs, and optionally if the distance (determined based on UE's location information at application layer) between the two UEs is smaller than a threshold. Optionally the application server could also inform at what time the switching should be performed. Similarly the application server could either directly inform the switching to the UE's upper layer, or informs the switching to the NW, which then forwards the switching to the UEs.

In an embodiment of the present disclosure, to facilitate the PC5 path establishment, the application server could send the sidelink L2 (layer 2) ID of both UE1 and UE2 to at least one of the two UEs. For option 1 and 2, this could be sent either before or at the time the path switching instructions is sent to the UE. For option 1 and 2, the two UEs will start to transmit/receive over PC5 after receiving the path switching instruction, the UE that receives the sidelink L2 IDs will (try to) establish a PC5 link with the other UE. If succeeded, the two UEs could then communicate over PC5.

In an embodiment of the present disclosure, for option 1 and 2, if UEs receive the instruction from the application server to switch the path without being informed about sidelink L2 IDs, they need to first conduct service discovery over sidelink before they start PC5 link establishment and data transmission.

For option 3, the UE itself determines to select the PC5 path if PC5 is authorized to be used.

For option 3, the UE(s) that selects the PC5 path will send a path switching request over PC5 (in e.g. broadcast mode) or Uu, the request should contain the application layer ID of the UEs, or if available, the sidelink L2 ID of the UEs. By receiving this request, the peer UE knows that the Uu path is no more available, it acknowledges the request if it is authorized to use PC5, its sidelink L2 ID could be included in the acknowledgement if it did not receive the L2 ID in the path switching request. The two UEs could then communicate over PC5 if the request is acknowledged.

Note that the path switching could be performed per service service information. In this case the path availability is determined per service, e.g. a service may be only allowed to run over cellular path, or whether the path can ensure sufficient QoS of a certain service. The service information (e.g. service ID) should be included in the path switching message over Uu and PC5, to indicate for which service(s) the path switching needs to be made.

Figure 4B:
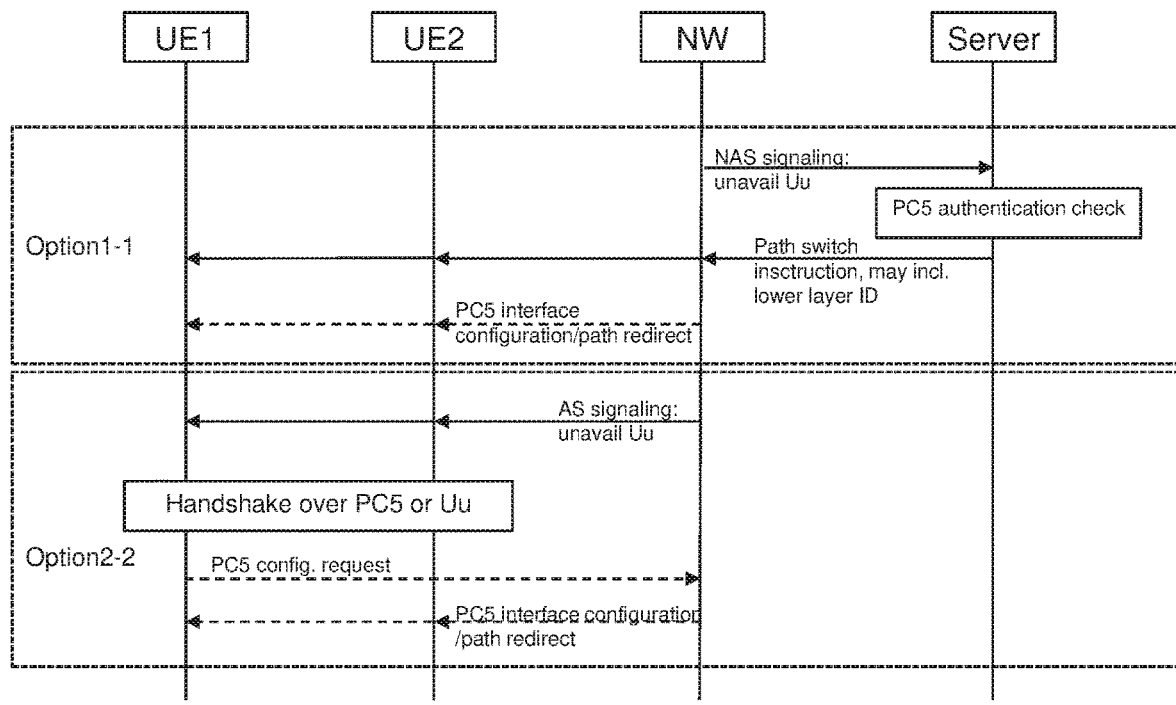
FIG. 4B shows a procedure for path switch from Uu to PC5 according to another embodiment of the present disclosure.

FIG. 4B shows a procedure for path switch from Uu to PC5 according to another embodiment of the present disclosure. In this embodiment, the path switch is initiated by the network (NW). The NW can determine the Uu path to some UE(s) becomes (or is going to become) unavailable for one or more services due to e.g. degradation in channel quality (e.g., based on UE measurement report) or admission control. There are also different ways to inform the Uu path unavailability to the upper layer:

Option1-1: The NW informs the Uu path unavailability for one or more services and optionally the PC5 availability to the application server. The Uu path unavailability may be explicitly signaled to the application server, or implicitly signaled, i.e., the gNB/eNB releases the one or more radio bearers associated to the concerned service. The notification of Uu radio bearer release for the concerned service, corresponds to Uu path unavailability at application server.

Option2-2: The NW informs the Uu path unavailability for one or more services and optionally the PC5 availability to the UE(s) (optionally only those UEs authorized to use PC5), and the UE(s) further inform the unavailability to their upper layer (e.g. the application client).

In an embodiment of the present disclosure, irrespective of the above options, the network may perform any of the following operations:

Signal the release, i.e. deconfigure, the one or more Uu radio bearers associated to the concerned service or release the whole RRC Uu connection (i.e. the gNB/eNB transmits RRCConnectionRelease).

In case the PC5 path is available, the gNB/eNB may in combination with the release message, transmits a "path redirection" signal to redirect the concerned released bearers to the PC5 interface and optionally provide one or more SL resource pools for the given service. The gNB/eNB may also configure the UE to perform SL discovery and provide a pool for SL discovery so that said UE1 can start discovery of UE2

If the gNB/eNB releases the whole RRC Uu connection and no SL sidelink resource pool is provided by the gNB/eNB, the UE enters IDLE mode.

In an embodiment of the present disclosure, for option 1-1, the application server first identifies which UE pairs are impacted by the Uu path unavailability, and send the path switching instruction to the identified UE pairs if PC5 is authorized to be used for these UEs and optionally if the distance (determined based on UE's location information at application layer) between the UE pairs is smaller than a threshold, the path switching instruction may contain other information similar as described in option 1-1 and 2-2 with UE determined path availability. The UE pairs will start to transmit/receive over PC5 after receiving the path switching instruction, the UE that receives the sidelink L2 IDs will (try to) establish a PC5 link with the peer UE. If succeeded, the two UEs could then communicate over PC5. In one alternative, before transmitting the "path redirection" signal, the gNB/eNB checks if the given service is allowed to be transmitted over the PC5 interface as per above embodiments gnb. In another method, the gNB/eNB checks if the given service is allowed to be transmitted over the PC5 interface with a core network node or application server and waits for a confirmation.

In an embodiment of the present disclosure, for option 1-1, if UEs receive the instruction from the application server to switch the path without being informed about sidelink L2 IDs, they need to first conduct path switch request and/or service discovery over sidelink before they start PC5 link establishment and data transmission.

In an embodiment of the present disclosure, for option 2-2, the UE(s) receiving the Uu path unavailability and authorized to use PC5 will send a path switching request over PC5 (in e.g. broadcast mode) or Uu, the request should contain the application layer ID or any equivalent ID for the given service and the peer UE. By receiving this request, the peer UE knows that the Uu path is no more available, it acknowledges the request if it is authorized to use PC5, the peer UE could include its sidelink L2 ID in the acknowledgement. The two UEs could then communicate over PC5 if the request is acknowledged. Before the path switching request, the two or more UEs involved may initiate a discovery procedure.

In an embodiment of the present disclosure, in option 1-1, the application server may inform the NW which UE pairs are impacted by the Uu unavailability and should/could switch the path to PC5, and the NW may inform some PC5 (e.g. resource pool) configurations to those UEs.

In an embodiment of the present disclosure, in option 1-2, the UE could send a request to the NW for sending the PC5 configurations. Alternatively, the UE could obtain the PC5 configurations from relevant SIB(s) (applicable to all the options).

In an embodiment of the present disclosure, the path switching could be performed per service. In this case, the service information (e.g. service ID) should be included in the path switching message over Uu and PC5, to indicate for which service(s) the path switching needs to be made.

FIG. 4C shows a procedure for path switch from PC5 to Uu according to an embodiment of the present disclosure. In this embodiment, UE1 and UE2 are communicating (certain service(s)) with each other over PC5. The availability of PC5 and Uu path can be determined (independently) at each UE side, either by the UE itself or by the NW (potentially based on UE's feedback) and optionally informing the determination results to the UE. There are different ways to perform the path switching when the PC5 path becomes (or is going to become) unavailable:

Option 1-3 with handshake over PC5: The two UEs handshake with each other over PC5 to check if the Uu path is available for both of the UEs. If that is the case, the two UEs start to communicate (the service(s)) over Uu. The UE(s) may first need to enter connected mode if it is currently in idle or inactive mode, which implies that random access procedure should be performed.

Option 2-3 without handshake over PC5: The UE(s) which has available Uu path enters connected mode if it is currently in idle or inactive mode, and checks with the application server if the peer UE is active on the application server (e.g. there is an active connection between the peer UE and the application server), the peer UE could be identified by the application layer and/or the sidelink L2 ID. Regarding data communication between the UE(s) with available Uu path and application server, there are different ways to handle it:
1. The data communication over Uu could be started before checking the status of the peer UE, while the data communication could be suspended or stopped if the peer does not setup connection with the application server for a certain (pre)configured time.
2. The data communication over Uu could be started only when the peer already setups connection with the application server.

In an embodiment of the present disclosure, when the UE is in connected mode when transmitting over PC5, checking of the peer UE's status with the application server could be performed by the NW, MME or AMF, which could be performed periodically, based on the UE's request, or the PC5 quality becomes (or is going to become) insufficient. The peer UE could be identified based on the reported sidelink L2 ID. The application server could inform the checking results to the NW and/or the UE. Besides, the NW may instruct the UE when to switch path from PC5 to Uu and when to start the data communication.

In an embodiment of the present disclosure, when the UE is in connected mode, the gNB/eNB may redirect the PC5 SL bearer to Uu for the given service. The "path redirection" message may include the release of the PC5 SL bearer and the setup (including configuration parameters) of the new Uu radio bearer for the given service.

In an embodiment of the present disclosure, irrespective of which specific option above is executed, the following happens depending on the RRC status of the UEs:

The UE is IDLE mode at the moment of the switch:
  The SL connection/bearer for the given service is released only if there is at least one UE which is currently involved in SL communication for the given service, that performs Uu random access procedure successfully. This implies that such given UE triggers release of the SL bearer/connection and optionally signal it to the other one or more UE, if the random access procedure is successful.
  The release of the SL radio bearer happens only if all the UEs involved in the SL communication for this given service successfully perform Uu random access or Uu bearer established for the given service.

The UE is already in RRC connected mode at the moment of the switch:
  The SL connection/bearer for the given service is released only if there is at least one UE which is currently involved in SL communication for the given service, for which a Uu bearer for the given V2X service is established by the network. This implies that such given UE triggers release of the SL bearer/connection and optionally signal it to the other one or more UE, if the corresponding bearer is successfully established, e.g "path redirection" configuration received.
  The release of the SL radio bearer happens only if all the UEs involved in the SL communication for this given service successfully perform Uu random access or Uu bearer established for the given service.

In an embodiment of the present disclosure, path switching from PC5 to Uu could also be performed per service. It could happen that some services are communicated over PC5 while some others are communicated over Uu. In this case he service information (e.g. service ID) should be included in the path switching, the handshake and the status checking message over Uu or PC5, to indicate for which service(s) the message is relevant.

With the proposed methods as described above, the path availability at both Tx and Rx side could be taken into account in different communication technologies such as Uu/PC5 path switching, which mitigates unnecessary communication technologies such as Uu/PC5 path switching, reduces the switching failure, and improves the performance.

Consistent with one or more of the embodiments discussed above, FIG. 5 shows a flowchart of a method 500 according to an embodiment of the present disclosure. The method 500 illustrated in FIG. 5 may be performed by an apparatus implemented at a first terminal device or communicatively coupled to a first terminal device. As such, the terminal device may provide means for accomplishing various parts of the method 500 as well as means for accomplishing other processes in conjunction with other components. For some parts which have been described in the above embodiments, detailed description thereof is omitted here for brevity.

At block 502, the first terminal device may obtain information about one or more candidate communication technologies for at least one service. The first terminal device may obtain this information in various ways. For example, the first terminal device may generate at least some of this information or receive this information from a network device, a core network device or an application server. The one or more candidate communication technologies may be determined in various ways. For example, the one or more candidate communication technologies for the at least one service may be determined based on the availability of the one or more candidate communication technologies of at least one second terminal device.

At block 504, the first terminal device may determine availability of the one or more candidate communication technologies of the first terminal device.

In an embodiment, the availability of the one or more candidate communication technologies is determined based on at least one of a congestion or interference level of each of the one or more candidate communication technologies each of the one or more candidate communication technologies is not barred by a network device; radio resources are assigned for transmission of at least one service in each of the one or more candidate communication technologies; a QoS requirement associated to the at least one service; QoS measurements of the one or more candidate communication technologies; the first terminal device and a second terminal device that are located in a same geographical area have discovered each other; subscription information of the at least one service; traffic load characteristics of the one or more candidate communication technologies; and packet characteristics of the at least one service (e.g., whether the packets are Internet Protocol (IP) packets or non-IP packets).

In an embodiment, the subscription information of the at least one service may comprise information indicating one of the at least one service being permitted on one or more specified communication technologies, one or more specified communication technologies at a specified time period, one or more specified communication technologies at a specified location, and one or more specified communication technologies at a specified time period and at a specified location.

In an embodiment, determining availability of the one or more candidate communication technologies may be performed by a lower layer of a radio protocol architecture of the first terminal device, when only one specified candidate communication technology can be selected, no candidate communication technology availability is indicated by the lower layer to the upper layers of the radio protocol architecture when the one specified candidate communication technology is available or the one specified candidate communication technology unavailability is indicated by the lower layer to the upper layers when the one specified candidate communication technology is not available.

At block 506, the first terminal device may select at least one communication technology from the one or more candidate communication technologies for communication between the first terminal device and at least one second terminal device based on the availability of the one or more candidate communication technologies. For example, when there are two or more candidate communication technologies can be selected, the first terminal device may select at least one communication technology from the one or more candidate communication technologies based on a predefined rule, for example based on priority, or based on an selection order of the one or more candidate communication technologies, based on network load, etc.

Consistent with one or more of the embodiments discussed above, FIG. 6 shows a flowchart of a method 600 according to an embodiment of the present disclosure. The method 600 illustrated in FIG. 6 may be performed by an apparatus implemented at a first terminal device or communicatively coupled to a first terminal device. As such, the terminal device may provide means for accomplishing various parts of the method 600 as well as means for accomplishing other processes in conjunction with other components. For some parts which have been described in the above embodiments, detailed description thereof is omitted here for brevity.

At block 602, the first terminal device may determine that a first communication technology used for a communication between the first terminal device and at least one second terminal device becomes or is going to become unavailable. For example, the first terminal device may monitor communication conditions of the first communication technology or check the data error ratio, or receive a state indication of the first communication technology from the network device, etc. and then determine that a first communication technology becomes or is going to become unavailable.

At block 604, the first terminal device may select a second communication technology from the one or more candidate communication technologies based on the availability of the one or more candidate communication technologies. The selection may be similar to block 506 of FIG. 5.

In an embodiment, the first terminal device may inform the first communication technology unavailability to a network device; and receive resource configuration of the second communication technology and path switching instruction from the network device.

In an embodiment, the first terminal device may inform the first communication technology unavailability to the network device directly. In another embodiment, the first terminal device may inform the first communication technology unavailability to an application server which informs the first communication technology unavailability to the network device.

In an embodiment, the first terminal device may inform the first communication technology unavailability to an application server; and receive a switching instruction indicating switching to the second communication technology from the application server.

In an embodiment, the first terminal device may receive the switching instruction in response to the application server determining that the second communication technology is authorized to be used for both the first terminal device and the at least one second terminal device and/or the distance between the first terminal device and the at least one second terminal device is smaller than a threshold.

In an embodiment, the switching instruction may comprise configuration information of the second communication technology.

In an embodiment, the first terminal device may conduct a discovery procedure related to the at least one second terminal device by using the second communication technology.

In an embodiment, the first terminal device may send a request for configuration information of the second communication technology to the network device; and receive a response including the configuration information of the second communication technology from the network device.

In an embodiment, the first terminal device may send a path switching request to the at least one second terminal device by using the first communication technology or the second communication technology; and receive a path switching response indicating whether the path switching request is approved by the at least one second terminal device.

In an embodiment, the path switching request may include an identifier related to the at least one service and/or configuration information of the second communication technology.

In an embodiment, the second communication technology may be a PC5 sidelink interface and the configuration information of the second communication technology may comprise a sidelink layer 2 identifier.

In an embodiment, the switching instruction may further indicate when to switch a path from the first communication technology to the second communication technology and/or when to start data communication.

In an embodiment, the first terminal device may obtain the availability of the second communication technology of the at least one second terminal device from the at least one second terminal device by using the first communication technology; and use the second communication technology when the second communication technology of the at least one second terminal device is available.

In an embodiment, the first terminal device may obtain the availability of the second communication technology of the second terminal device from an application server or the network device by using the second communication technology; and use the second communication technology when the second communication technology of the at least one second terminal device is available.

In an embodiment, when the first terminal device is in a connected mode of the second communication technology, the network device may redirect the first communication technology bearer to the second communication technology bearer.

In an embodiment, when the first terminal device is in an idle mode of the second communication technology, the first communication technology bearer is released only when at least one terminal device currently involved in first communication technology communication accesses the second communication technology communication successful, or all the terminal devices currently involved in first communication technology communication accesses the second communication technology successfully or establish the second communication technology bearer for the at least one service.

In an embodiment, when the first terminal device is in a connected mode of the second communication technology, the first communication technology bearer is released only when at least one terminal device currently involved in first communication technology communication establishes the second communication technology bearer for the at least one service, or all the terminal devices currently involved in first communication technology communication accesses the second communication technology successfully or establish the second communication technology bearer for the at least one service.

In an embodiment, the first terminal device may receive a path redirection message from the network device including a release of the first communication technology bearer and a setup of the second communication technology bearer.

In an embodiment, the path redirection message may indicate when to switch a path from the first communication technology to the second communication technology and/or when to start data communication.

In an embodiment, a new set of frequencies of a first communication technology is configured to the first terminal device, and when a currently used frequency which is not included in the new set of frequencies is not available for the service, a frequency of the new set of frequencies is selected by a network device for the service.

In an embodiment, the one or more candidate communication technologies comprise Third Generation Partnership Project (3GPP) communication technology and non-3GPP communication technology.

In an embodiment, the at least one service may comprise vehicle to everything (V2X) service.

Consistent with one or more of the embodiments discussed above, FIG. 7 shows a flowchart of a method 700 according to an embodiment of the present disclosure. The method 700 illustrated in FIG. 7 may be performed by an apparatus implemented at a network device or an application server or communicatively coupled to a network device or an application server. As such, the network device or the application server may provide means for accomplishing various parts of the method 700 as well as means for accomplishing other processes in conjunction with other components. For some parts which have been described in the above embodiments, detailed description thereof is omitted here for brevity.

At block 702, the network device or the application server may obtain information about one or more candidate communication technologies for at least one service.

At block 704, the network device or the application server may determine availability of the one or more candidate communication technologies for example at a first terminal device and/or at least one second terminal device.

At block 706, the network device or the application server may select at least one communication technology for communication between the first terminal device and at least one second terminal device based on the availability of the one or more candidate communication technologies.

At block 708, the network device or the application server may send a selecting result to the first terminal device.

In an embodiment, the one or more candidate communication technologies for the at least one service is determined based on the availability of the one or more candidate communication technologies for example at a first terminal device and/or at least one second terminal device.

In an embodiment, the availability of the one or more candidate communication technologies is determined based on at least one of a congestion or interference level of each of the one or more candidate communication technologies each of the one or more candidate communication technologies is not barred by the network device; radio resources are assigned for transmission of at least one service in each of the one or more candidate communication technologies; a QoS requirement associated to the at least one service; QoS measurements of the one or more candidate communication technologies; the first terminal device and a second terminal device that are located in a same geographical area have discovered each other; subscription information of the at least one service; traffic load characteristics of the one or more candidate communication technologies; and packet characteristics of the at least one service.

In an embodiment, the subscription information of the at least one service comprises information indicating one of the at least one service being permitted on one or more specified communication technologies, one or more specified communication technologies at a specified time period, one or more specified communication technologies at a specified location, and one or more specified communication technologies at a specified time period and at a specified location.

Consistent with one or more of the embodiments discussed above, FIG. 8 shows a flowchart of a method 800 according to an embodiment of the present disclosure. The method 800 illustrated in FIG. 8 may be performed by an apparatus implemented at a network device or an application server or communicatively coupled to a network device or an application server. As such, the network device or the application server may provide means for accomplishing various parts of the method 800 as well as means for accomplishing other processes in conjunction with other components. For some parts which have been described in the above embodiments, detailed description thereof is omitted here for brevity.

At block 802, the network device or the application server may determine that a first communication technology used for a communication between the first terminal device and at least one second terminal device becomes or is going to become unavailable.

At block 804, the network device or the application server may select a second communication technology from the one or more candidate communication technologies based on the availability of the one or more candidate communication technologies.

At block 806, the network device or the application server may send a selecting result about the second communication technology to the first terminal device.

In an embodiment, the network device or the application server may send resource configuration of the second communication technology and path switching instruction to the first terminal device and/or the at least one second terminal device.

In an embodiment, the network device or the application server may select the second communication technology based on the availability of the one or more candidate communication technologies in response to the network device or the application server determining that the second communication technology is authorized to be used for both the first terminal device and the second terminal device and/or the distance between the first terminal device and the second terminal device is smaller than a threshold.

In an embodiment, the switching instruction further comprises configuration information of the second communication technology.

In an embodiment, the network device or the application server may receive a request for configuration information of the second communication technology from the first terminal device and/or the at least one second terminal device; and send a response including the configuration information of the second communication technology to the first terminal device and/or the at least one second terminal device.

In an embodiment, the second communication technology may be a PC5 sidelink technology and the configuration information of the second communication technology comprises a sidelink layer 2 identifier.

In an embodiment, the switching instruction may further indicate when to switch a path from the first communication technology to the second communication technology and/or when to start data communication.

In an embodiment, the network device or the application server may send a path redirection message to the first terminal device and/or the at least one second terminal device including a release of the first communication technology bearer and a setup of the second communication technology bearer.

In an embodiment, the path redirection message indicates when to switch a path from the first communication technology to the second communication technology and/or when to start data communication.

In an embodiment, a new set of frequencies of a first communication technology is configured to the first terminal device, and when a currently used frequency which is not included in the new set of frequencies is not available for the service, a frequency of the new set of frequencies is selected for the service.

In an embodiment, the one or more candidate communication technologies comprise Third Generation Partnership Project (3GPP) communication technology and non-3GPP communication technology.

In an embodiment, the at least one service comprises vehicle to everything (V2X) service.

FIG. 9 illustrates a simplified block diagram of an apparatus 910 that may be embodied in/as a terminal device according to an embodiment of the present disclosure.

The apparatus 910 may comprise at least one processor 911, such as a data processor (DP) and at least one memory (MEM) 912 coupled to the processor 911. The apparatus 910 may further comprise a transmitter TX and receiver RX 913 coupled to the processor 911. The MEM 912 stores a program (PROG) 914. The PROG 914 may include instructions that, when executed on the associated processor 911, enable the apparatus 910 to operate in accordance with the embodiments of the present disclosure, for example to perform any of the methods 500 and 600. A combination of the at least one processor 911 and the at least one MEM 912 may form processing means 915 adapted to implement various embodiments of the present disclosure.

Figure 10:
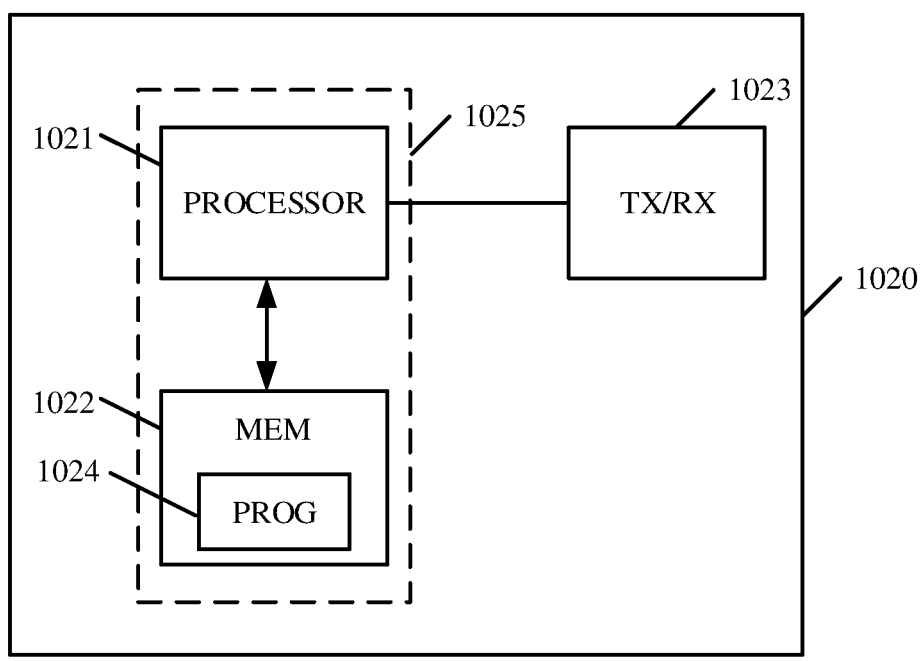
FIG. 10 illustrates a simplified block diagram of an apparatus according to another embodiment of the present disclosure.

FIG. 10 illustrates a simplified block diagram of an apparatus 1020 that may be embodied in/as a network device or an application server according to an embodiment of the present disclosure.

The apparatus 1020 may comprise at least one processor 1021, such as a data processor (DP) and at least one memory (MEM) 1022 coupled to the processor 1021. The apparatus 1020 may further comprise a transmitter TX and receiver RX 1023 coupled to the processor 1021. The MEM 1022 stores a program (PROG) 1024. The PROG 1024 may include instructions that, when executed on the associated processor 1021, enable the apparatus 1020 to operate in accordance with the embodiments of the present disclosure, for example to perform any of the methods 700 and 800. A combination of the at least one processor 1021 and the at least one MEM 1022 may form processing means 1025 adapted to implement various embodiments of the present disclosure.

Various embodiments of the present disclosure may be implemented by computer program executable by one or more of the processors 911, 1021, software, firmware, hardware or in a combination thereof.

The MEMs 912 and 1022 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processors 911 and 1021 may be of any type suitable to the local technical environment, and may include one or more of general purpose computers, special purpose computers, microprocessors, digital signal processors DSPs and processors based on multicore processor architecture, as non-limiting examples.

According to an aspect of the disclosure it is provided a computer program product being tangibly stored on a computer readable storage medium and including instructions which, when executed on at least one processor, cause the at least one processor to carry out any of the methods related to the terminal device as described above, such as the methods 500 and 600.

According to an aspect of the disclosure it is provided a computer-readable storage medium storing instructions which when executed by at least one processor, cause the at least one processor to carry out carry out any of the methods related to the network device or the application server as described above, such as the methods 700 and 800.

According to an aspect of the disclosure it is provided a computer program product being tangibly stored on a computer readable storage medium and including instructions which, when executed on at least one processor, cause the at least one processor to carry out any of the methods related to the terminal device as described above, such as the methods 500 and 600.

According to an aspect of the disclosure it is provided a computer-readable storage medium storing instructions which when executed by at least one processor, cause the at least one processor to carry out carry out any of the methods related to the network device or the application server as described above, such as the methods 700 and 800.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

Figure 11:
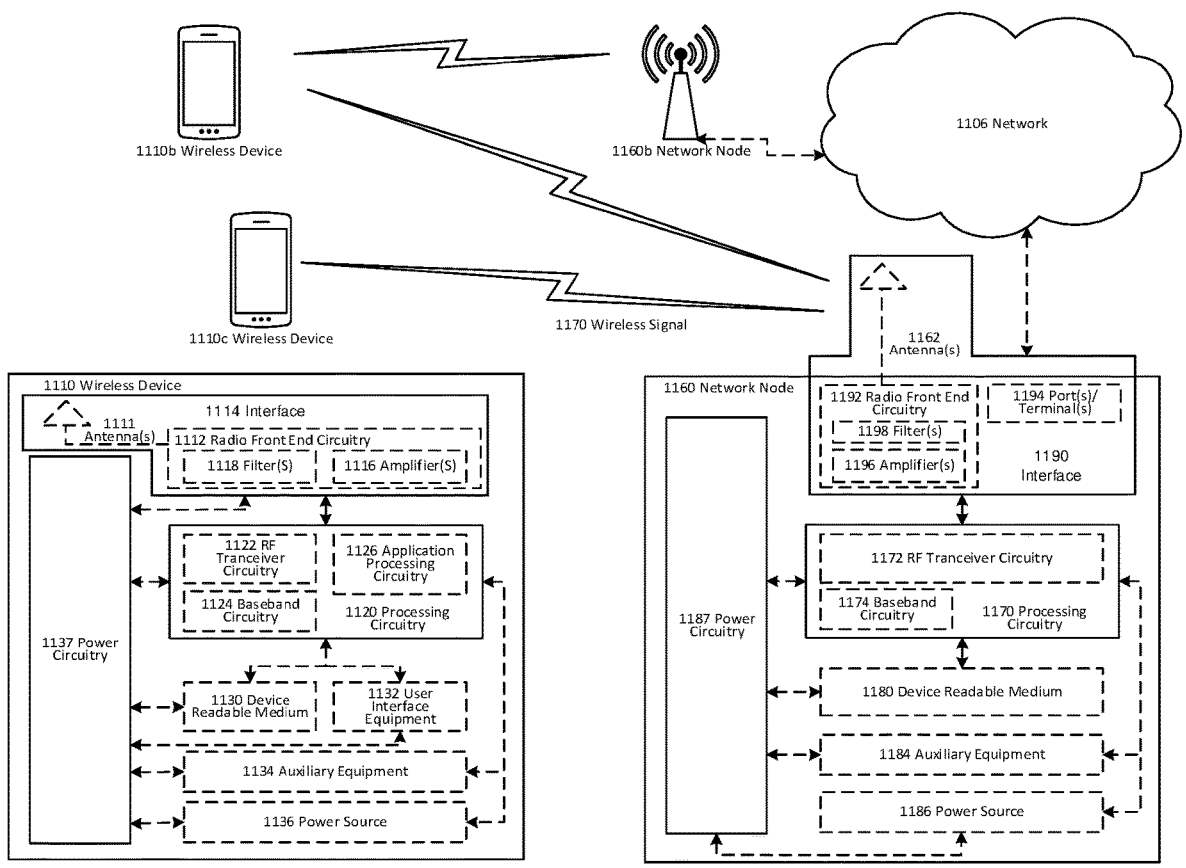
FIG. 11 is a schematic block diagram illustrating an example wireless network, according to particular embodiments of the present disclosure.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signaling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 12:
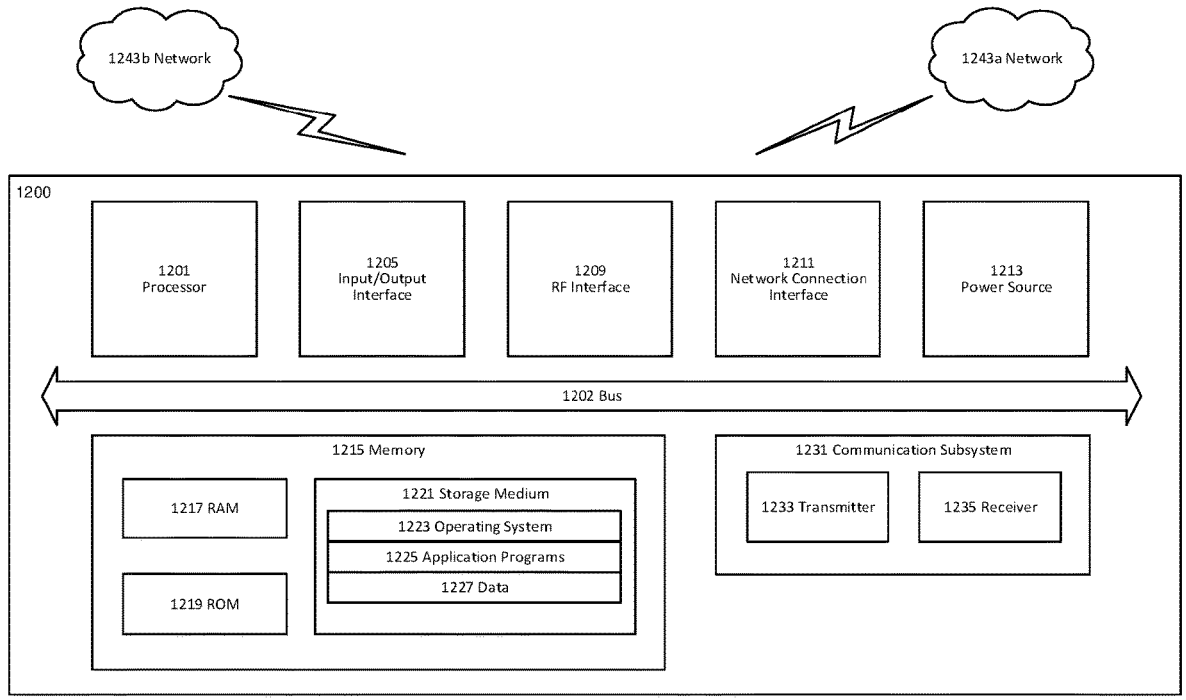
FIG. 12 is a schematic block diagram illustrating an example of a user equipment, according to particular embodiments of the present disclosure.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 13:
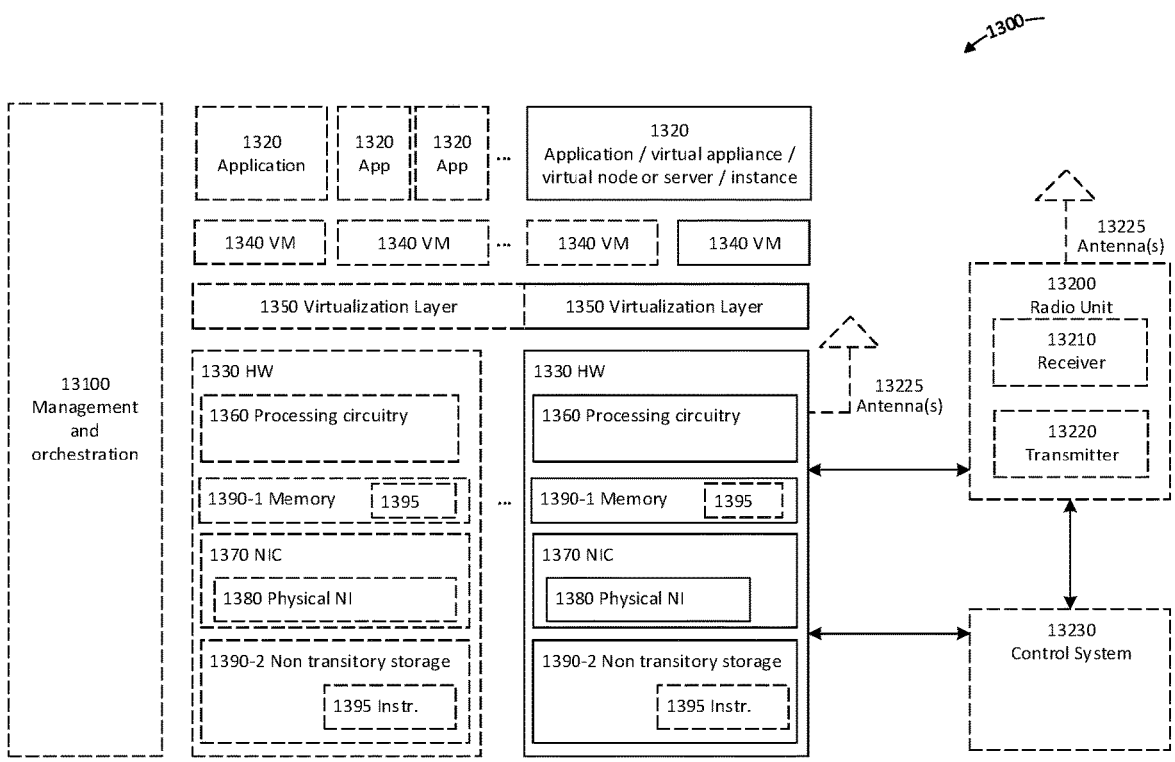
FIG. 13 is a schematic block diagram illustrating an example of a virtualization environment, according to particular embodiments of the present disclosure.

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signaling can be effected with the use of control system 13230 which may alternatively be used for communication between the hardware nodes 1330 and radio units 13200.

Figure 14:
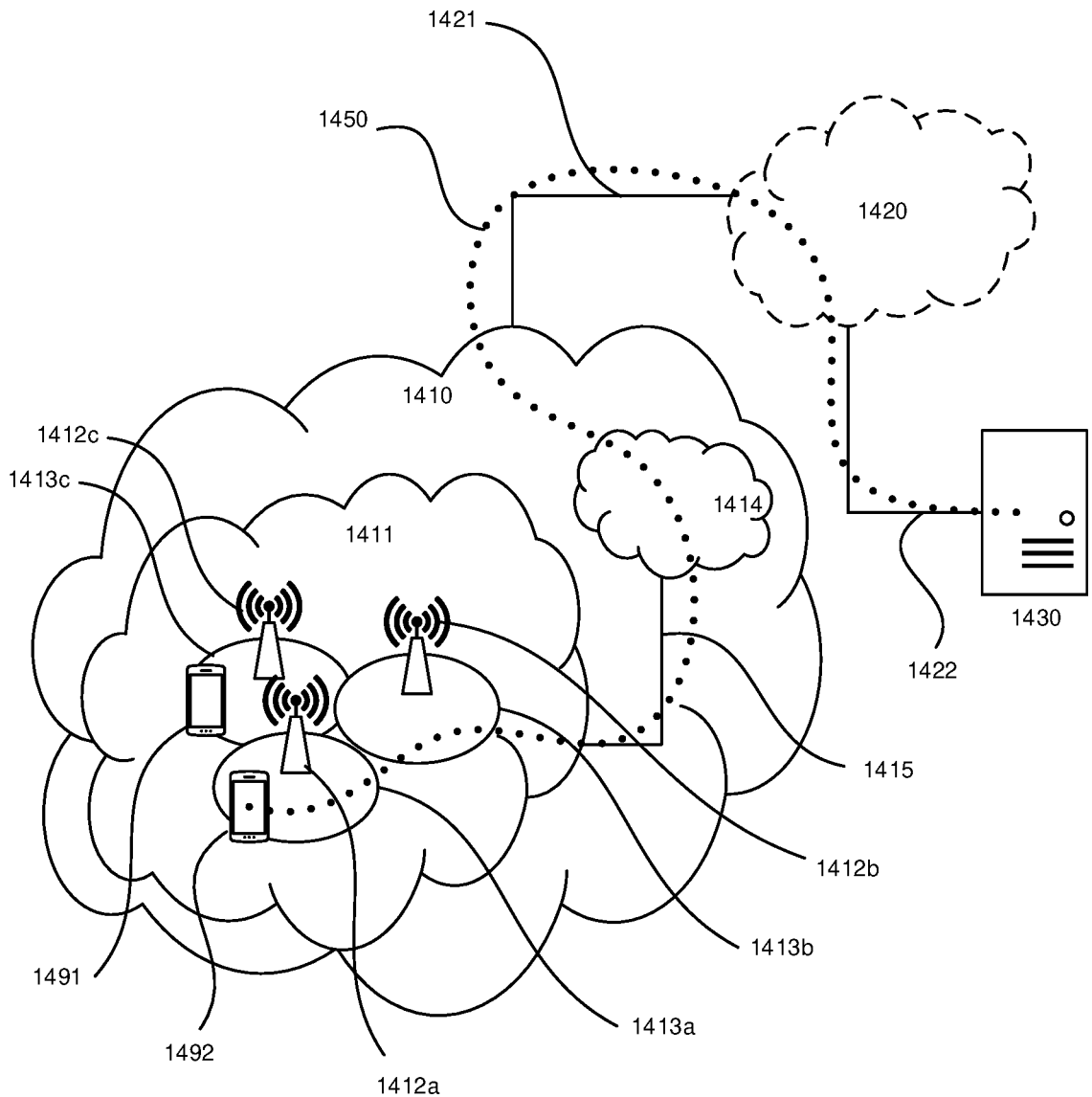
FIG. 14 is a schematic illustrating an example telecommunication network, according to particular embodiments of the present disclosure.

FIG. 14 illustrates a telecommunication network connected via an intermediate network to a host computer in accordance with some embodiments. In particular, with reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 15:
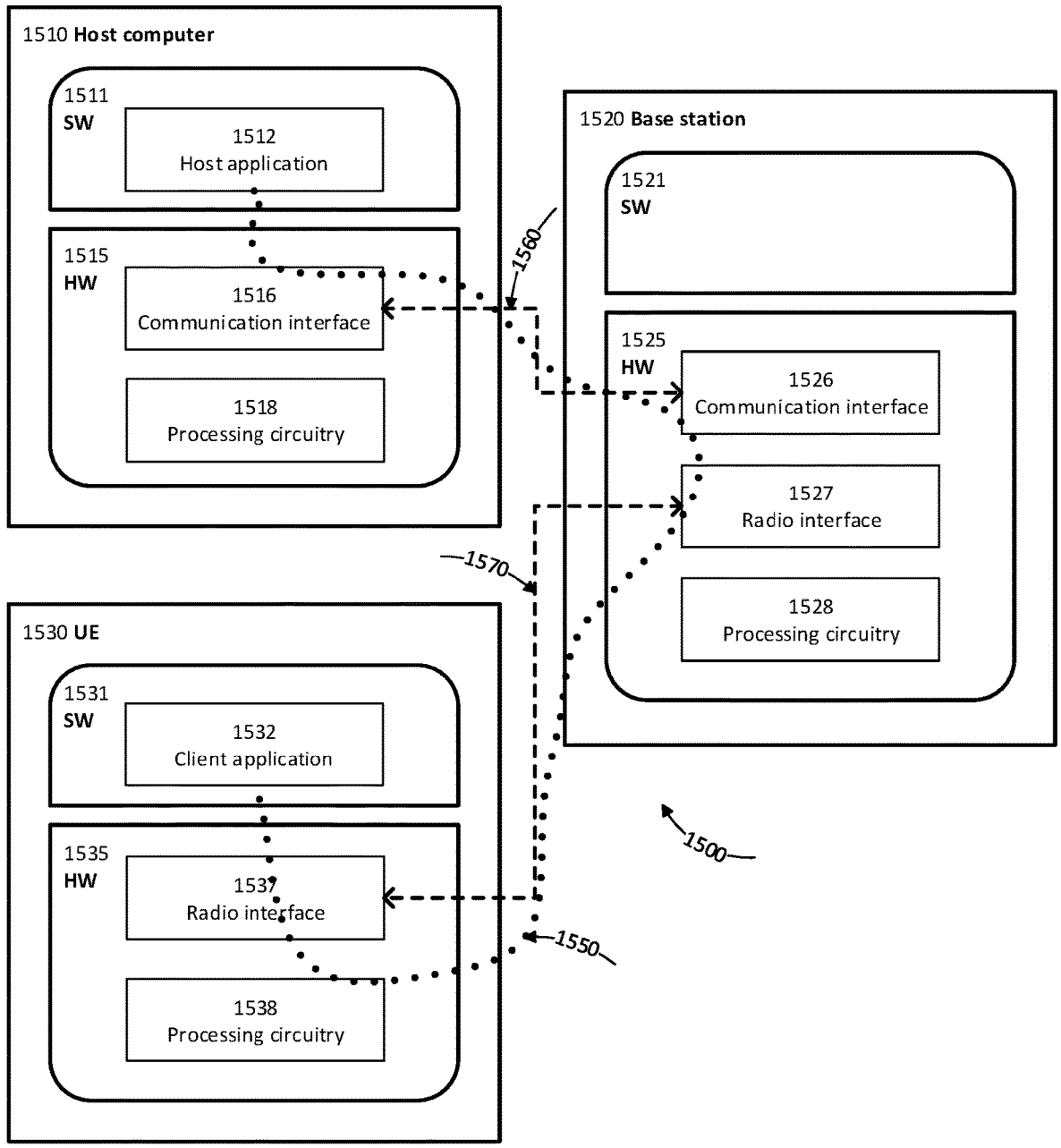
FIG. 15 is a schematic block diagram illustrating an example communication system, according to particular embodiments of the present disclosure.

Example implementations, in accordance with an embodiment, of the UE, base station and host computer discussed in the preceding paragraphs will now be described with reference to FIG. 15. FIG. 15 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412*a*, 1412*b*, 1412*c* and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve service continuity and thereby provide benefits such as the ability to handover between access nodes without a perceptible interruption in service.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 16:
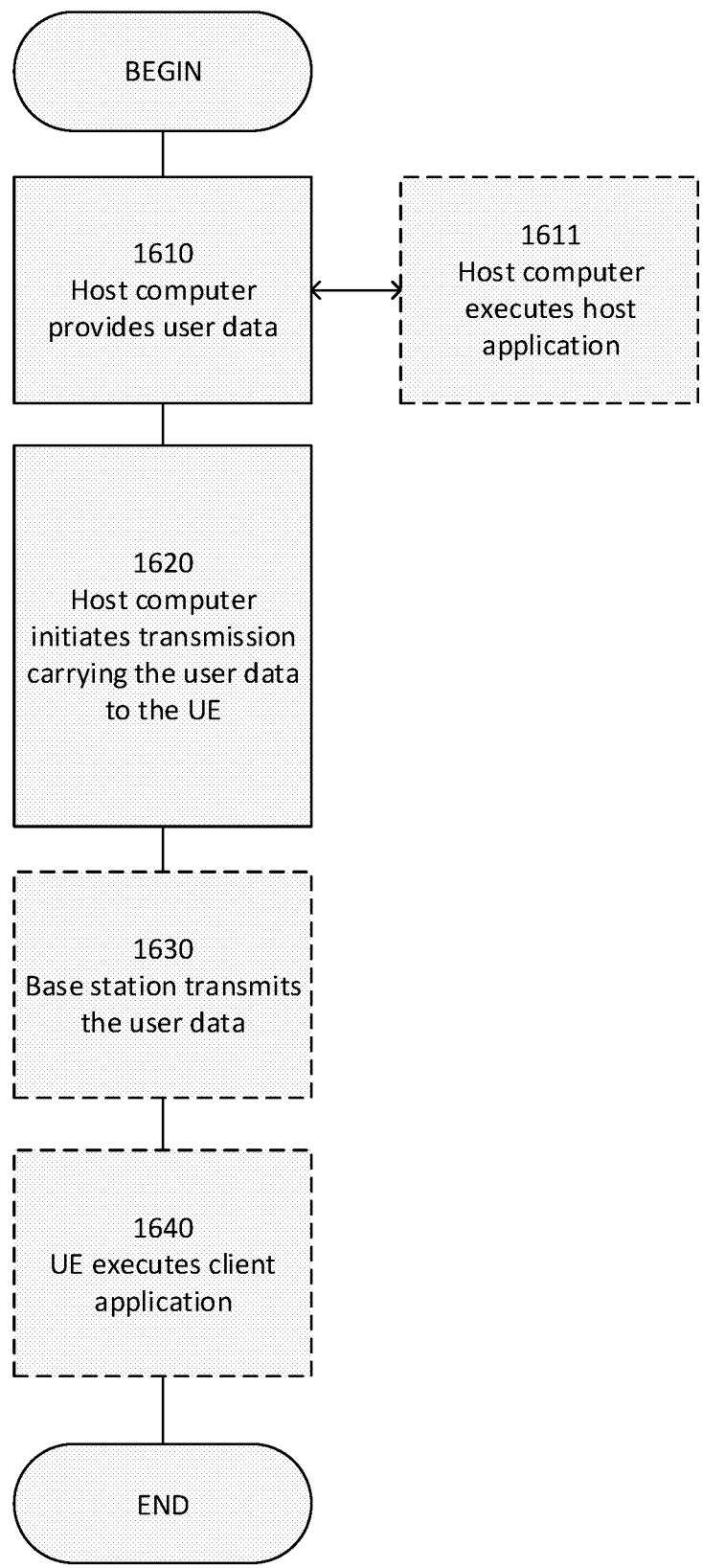
FIGS. 16-19 are flow diagrams, each of which illustrates an example method implemented in a communication system, according to particular embodiments of the present disclosure.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
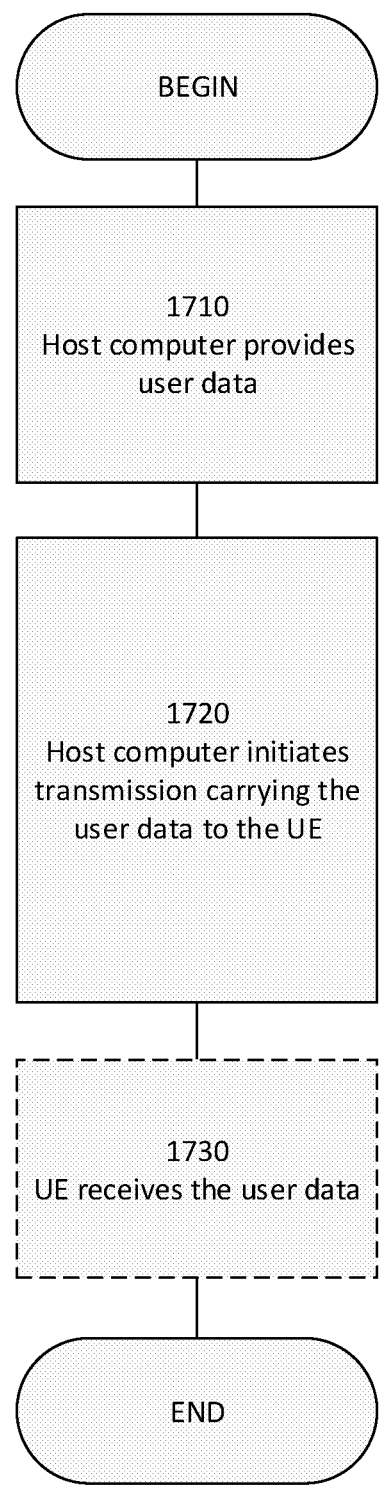

FIG. 17 is a flowchart illustrating a method implemented in a communication system, in accordance with one embodiment. The communication system includes a host computer, a base station and a UE which may be those described with reference to FIG. 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
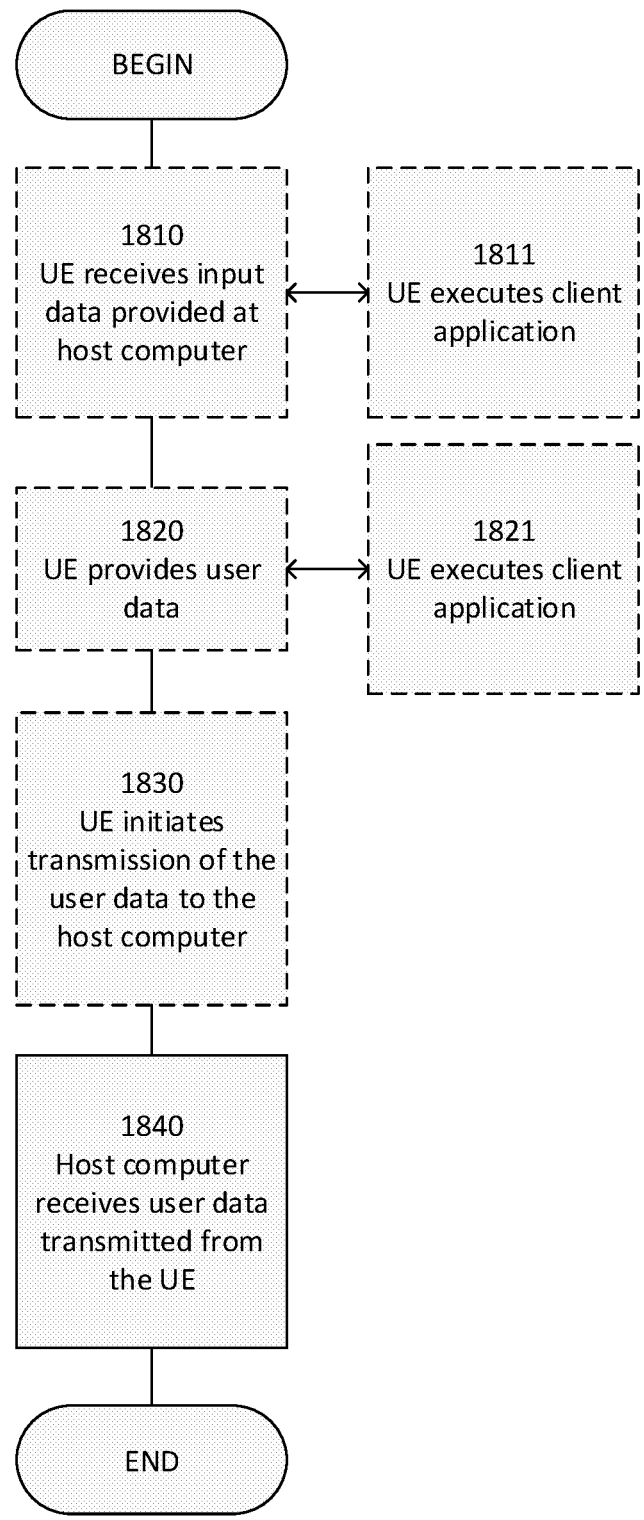

FIG. 18 is a flowchart illustrating a method implemented in a communication system, in accordance with one embodiment. The communication system includes a host computer, a base station and a UE which may be those described with reference to FIG. 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 19:
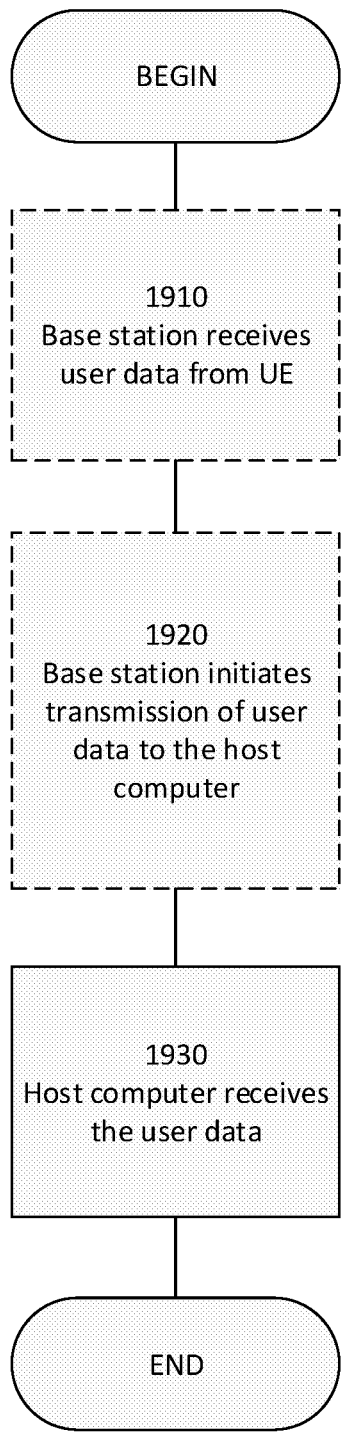

FIG. 19 is a flowchart illustrating a method implemented in a communication system, in accordance with one embodiment. The communication system includes a host computer, a base station and a UE which may be those described with reference to FIG. 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

Embodiments of the present disclosure may additionally or alternatively include any compatible combination of features described herein. Indeed, the present invention may be carried out in ways other than those specifically set forth herein without departing from essential characteristics of the invention. The present embodiments are to be considered in all respects as illustrative and not restrictive, and all changes coming within the meaning and equivalency range of the appended claims are intended to be embraced therein. For example, although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

What is claimed is:

1. A method implemented at a first terminal device, comprising:
   obtaining information about one or more candidate communication technologies for at least one vehicle-to-anything (V2X) service;
   determining availability of the one or more candidate communication technologies;
   selecting at least a first communication technology from the one or more candidate communication technologies for communication between the first terminal device and at least a second terminal device based on the availability of the one or more candidate communication technologies;
   after selecting the first communication technology, determining that the first communication technology is unavailable or is going to become unavailable; and
   after determining that the first communication technology becomes or is going to become unavailable, using a second communication technology from the one or more candidate communication technologies to communicate with the second terminal device, wherein
   the first communication technology is a radio interface between the first terminal device and a network node of a radio access network (RAN) and the second communication technology is a sidelink interface between the first terminal device and the second terminal device allowing the first communication device to directly communicate with the second terminal device, or
   the first communication technology is a sidelink interface between the first terminal device and the second terminal device allowing the first communication device to directly communicate with the second terminal device and the second communication technology is a radio interface between the first terminal device and a network node of a radio access network (RAN).

2. The method of claim 1, wherein the one or more candidate communication technologies for the at least one V2X service is determined based on the availability of the one or more candidate communication technologies of the at least one second terminal device.

3. The method of claim 1, further comprising:
   providing to a network device or an application server information indicating that the first communication technology is unavailable or is going to become unavailable; and
   receiving resource configuration of the second communication technology and path switching instruction from the network device or from the application server.

4. The method of claim 1, wherein
   the first terminal device is a component of a first vehicle, and
   the second terminal device is a component of a second vehicle.

5. The method of claim 1, further comprising:
   sending a request for configuration information of the second communication technology to the network device; and
   receiving a response including the configuration information of the second communication technology from the network device.

6. The method of claim 1, further comprising:
   sending a path switching request to the second terminal device by using the first communication technology or the second communication technology; and
   receiving a path switching response indicating whether the path switching request is approved by the second terminal device.

7. The method of claim 6, further comprising:
   receiving a path redirection message comprising a release of a first communication technology bearer and a setup of a second communication technology bearer, wherein the path redirection message indicates when to switch a path from the first communication technology to the second communication technology and/or when to start data communication.

8. The method of claim 1, wherein
   the second communication technology is a PC5 sidelink interface, and
   the configuration information of the second communication technology comprises a sidelink layer 2 identifier.

9. The method of claim 1, further comprising:
using the first communication technology to obtain from the second terminal device the availability of the second communication technology of the second terminal device; and
using the second communication technology when the second communication technology of the second terminal device is available.

10. The method of claim 1, further comprising:
using the second communication technology to obtain from an application server or a network device the availability of the second communication technology of the second terminal device; and
using the second communication technology when the second communication technology of the second terminal device is available.

11. The method of claim 1, wherein a new set of frequencies of a first communication technology is configured to the first terminal device, and
when a currently used frequency that is not included in the new set of frequencies is not available for the service, a frequency of the new set of frequencies is selected by a network device for the service.

12. An apparatus implemented at a first terminal device, comprising:
a processor; and
a memory coupled to the processor, said memory containing instructions executable by said processor, wherein the apparatus is operative to:
obtain information about one or more candidate communication technologies for at least one vehicle-to-anything (V2X) service;
determine availability of the one or more candidate communication technologies of the first terminal device;
select at least a first communication technology from the one or more candidate communication technologies for communication between the first terminal device and at least a second terminal device based on the availability of the one or more candidate communication technologies;
after selecting the first communication technology, determine that the first communication technology is unavailable or is going to become unavailable; and
after determining that the first communication technology becomes or is going to become unavailable, use a second communication technology from the one or more candidate communication technologies to communicate with the second terminal device, wherein
the first communication technology is a radio interface between the first terminal device and a network node of a radio access network (RAN) and the second communication technology is a sidelink interface between the first terminal device and the second terminal device allowing the first communication device to directly communicate with the second terminal device, or
the first communication technology is a sidelink interface between the first terminal device and the second terminal device allowing the first communication device to directly communicate with the second terminal device and the second communication technology is a radio interface between the first terminal device and a network node of a radio access network (RAN).

13. A non-transitory computer-readable storage medium storing instructions which when executed by at least one processor, cause the at least one processor to perform the method of claim 1.

* * * * *